US006992257B2

(12) United States Patent
Follingstad et al.

(10) Patent No.: US 6,992,257 B2
(45) Date of Patent: Jan. 31, 2006

(54) ELECTRONIC SIGNAL TRANSMISSION AND SWITCHING JACK

(75) Inventors: Michael Follingstad, Edina, MN (US); Peter Adams, Minneapolis, MN (US); Jeffrey Peters, Eagan, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 571 days.

(21) Appl. No.: 09/828,706

(22) Filed: Apr. 6, 2001

(65) Prior Publication Data

US 2002/0173188 A1 Nov. 21, 2002

(51) Int. Cl.
*H01R 17/18* (2006.01)

(52) U.S. Cl. .................... 200/51 R; 439/49; 439/668
(58) Field of Classification Search ........... 200/51 R, 200/51.02, 51.03–51.08, 51.11; 439/49, 54, 439/55, 59, 61–65, 76.1, 660, 608, 669, 188
See application file for complete search history.

(56) References Cited

U.S. PATENT DOCUMENTS

| 688,673 | A | | 12/1901 | North |
|---|---|---|---|---|
| 3,052,842 | A | | 9/1962 | Frohman et al. |
| 3,188,524 | A | | 6/1965 | Williams |
| 3,692,966 | A | | 9/1972 | Lancaster |
| 4,080,040 | A | | 3/1978 | Lancaster |
| 4,514,030 | A | | 4/1985 | Triner et al. .......... 339/176 MP |
| 4,770,639 | A | | 9/1988 | Lau |
| 4,797,114 | A | | 1/1989 | Lau |
| 4,815,104 | A | * | 3/1989 | Williams et al. ............ 375/257 |
| 4,840,568 | A | | 6/1989 | Burroughs et al. ........... 439/49 |
| 4,861,281 | A | | 8/1989 | Warner |
| 4,874,317 | A | | 10/1989 | Lau |
| 4,878,847 | A | | 11/1989 | Rutledge |
| 5,039,824 | A | | 8/1991 | Takashima et al. |
| 5,145,380 | A | | 9/1992 | Holcomb et al. |
| 5,199,878 | A | | 4/1993 | Dewey et al. ................ 439/49 |
| 5,233,501 | A | * | 8/1993 | Allen et al. .................. 361/733 |
| 5,269,708 | A | | 12/1993 | DeYoung et al. |
| 5,393,249 | A | | 2/1995 | Morgenstern et al. ...... 439/668 |
| 5,439,395 | A | | 8/1995 | Laukzemis |
| 5,550,755 | A | | 8/1996 | Martin et al. |
| 5,552,962 | A | | 9/1996 | Feustel et al. |

(Continued)

FOREIGN PATENT DOCUMENTS

| JP | 07211375 | 8/1995 |
|---|---|---|
| WO | WO 96/37929 | 11/1996 |

OTHER PUBLICATIONS

ADC Pro–Patch Installation Drawings, 1 page, dated Mar. 10, 1997.

(Continued)

*Primary Examiner*—Michael A. Friedhofer
(74) *Attorney, Agent, or Firm*—Merchant & Gould P.C.

(57) ABSTRACT

The present invention relates to an electronic signal switching module with connectors on a first side for connecting with a variety of devices and sources and with jacks for receiving patch cords on a second side. The switching modules include two position switches in the circuitry connecting the jacks with the connectors which allow the module to be configured as a straight-through patching module, a fully normal module with paired jacks or a half normal module with paired jacks. One alternative of the invention utilizes card edge connectors on the first side. Another aspect of the invention involves a chassis for holding a plurality of switching modules adjacent to and electronically connected with a plurality of connecting modules. The switching modules may also include designation lenses adjacent to the jacks for holding indicia.

66 Claims, 16 Drawing Sheets

U.S. PATENT DOCUMENTS

| | | | |
|---|---|---|---|
| 5,575,665 A | | 11/1996 | Shramawick et al. |
| 5,582,525 A | | 12/1996 | Louwagie et al. ........... 439/668 |
| 5,685,741 A | * | 11/1997 | Dewey et al. .............. 439/660 |
| 5,879,197 A | * | 3/1999 | Dewey ....................... 439/668 |
| 5,938,478 A | | 8/1999 | Werner |
| 5,997,311 A | | 12/1999 | Crouse et al. |
| 6,038,766 A | | 3/2000 | Werner |
| 6,116,961 A | * | 9/2000 | Henneberger et al. ...... 439/668 |
| 6,186,798 B1 | | 2/2001 | Follingstad et al. ....... 439/76.1 |
| 6,535,367 B1 | | 3/2003 | Carpenter et al. |
| 6,540,562 B1 | | 4/2003 | Baker et al. |
| 2004/0067671 A1 | | 4/2004 | Eckhart |

OTHER PUBLICATIONS

ADC Pro–Patch Installation Drawings, 2 pages; dated Oct. 26, 1996.

ADC Pro–Patch Assembly Drawings, 1 page; dated March 10, 1997.

Photos of a product manufactured by Switchcraft. Inc. 10 pages; publicly disclosed Apr. 23, 2001.

ADC Telecommunications Inc., *Broadcast and Entertainment Products Catalog, 8$^{th}$ Edition*. pp. 1–55 (May 2000).

Audio Accessories Inc., Audio–line Catalog. pp. 1–36 (Date Unknown).

Bittree Incorporated, *High Performance Patching Systems Catalog*. pp. 1–14 (©2000).

Mosses & Mitchell, *Professional Broadcast & Studio Products Catalog*, 12 pgs. (Date Unknown).

Bittree Incorporated, *High Performance Patching Systems Catalog*, pp. 1–14 (® 1999).

* cited by examiner

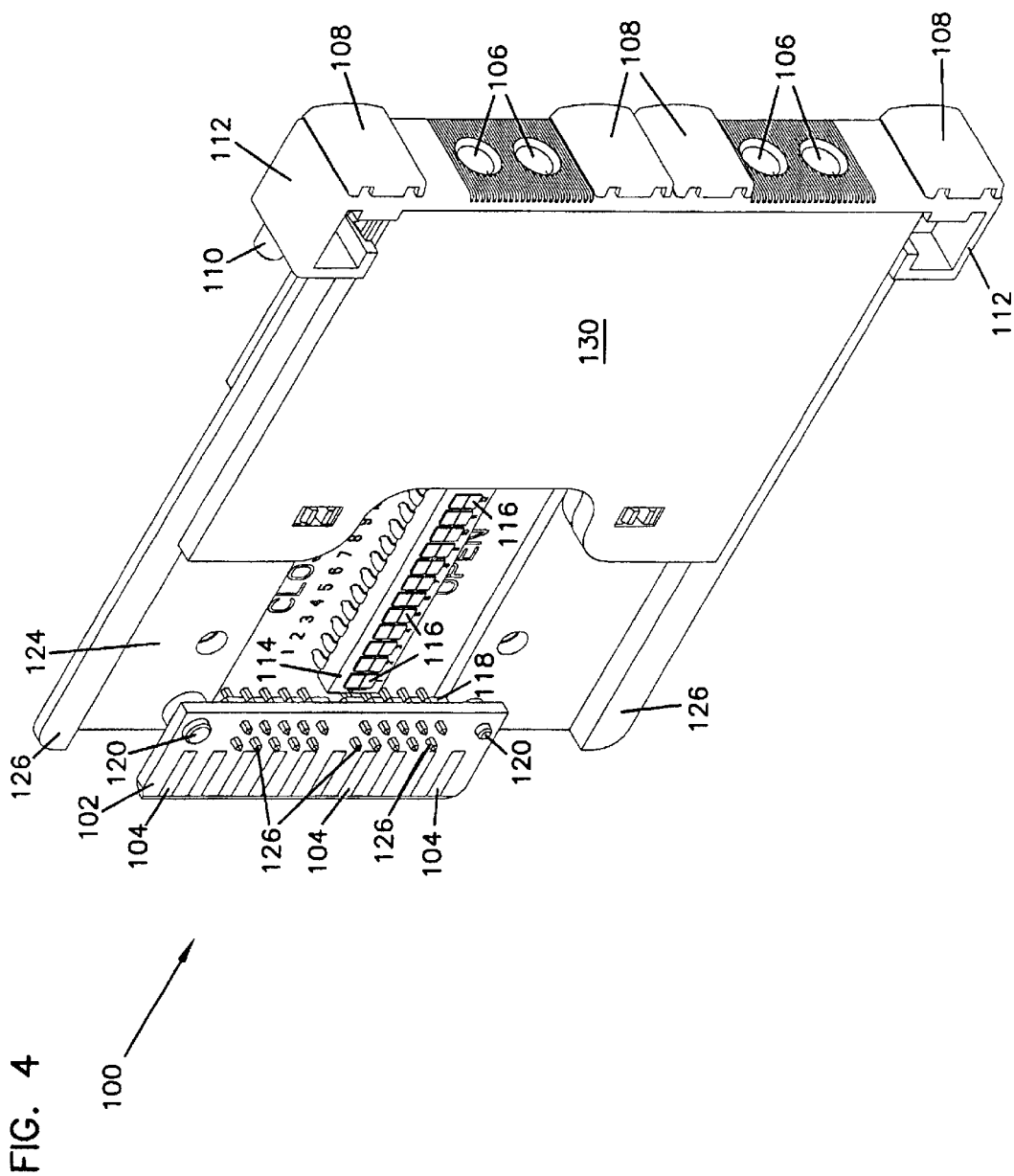

FIG. 9

| SWITCH POSITION | CKT G1 TO G2 | | | | | | CKT G3 TO G4 | | | | | |
|---|---|---|---|---|---|---|---|---|---|---|---|---|
| | 1 | 2 | 3 | 4 | 5 | 6 | 7 | 8 | 9 | 10 | 11 | 12 |
| NO NORMALS – NO SLEEVE BUSS | O | O | O | O | O | O | O | O | O | O | O | O |
| FULL NORMALS – NO SLEEVE BUSS | X | □ | X | □ | O | O | X | X | O | O | O | O |
| 1/2 NORMAL – NO SLEEVE BUSS | □ | X | □ | X | O | O | □ | X | X | O | O | O |
| SLEEVE BUSS J1 | □ | □ | □ | □ | X | O | □ | □ | □ | □ | □ | □ |
| SLEEVE BUSS J2 | □ | □ | □ | □ | □ | X | □ | □ | □ | □ | □ | □ |
| SLEEVE BUSS J3 | □ | □ | □ | □ | □ | □ | □ | □ | □ | □ | X | □ |
| SLEEVE BUSS J4 | □ | □ | □ | □ | □ | □ | □ | □ | □ | □ | □ | X |

SWITCH LEGEND

O = OPEN
X = CLOSED

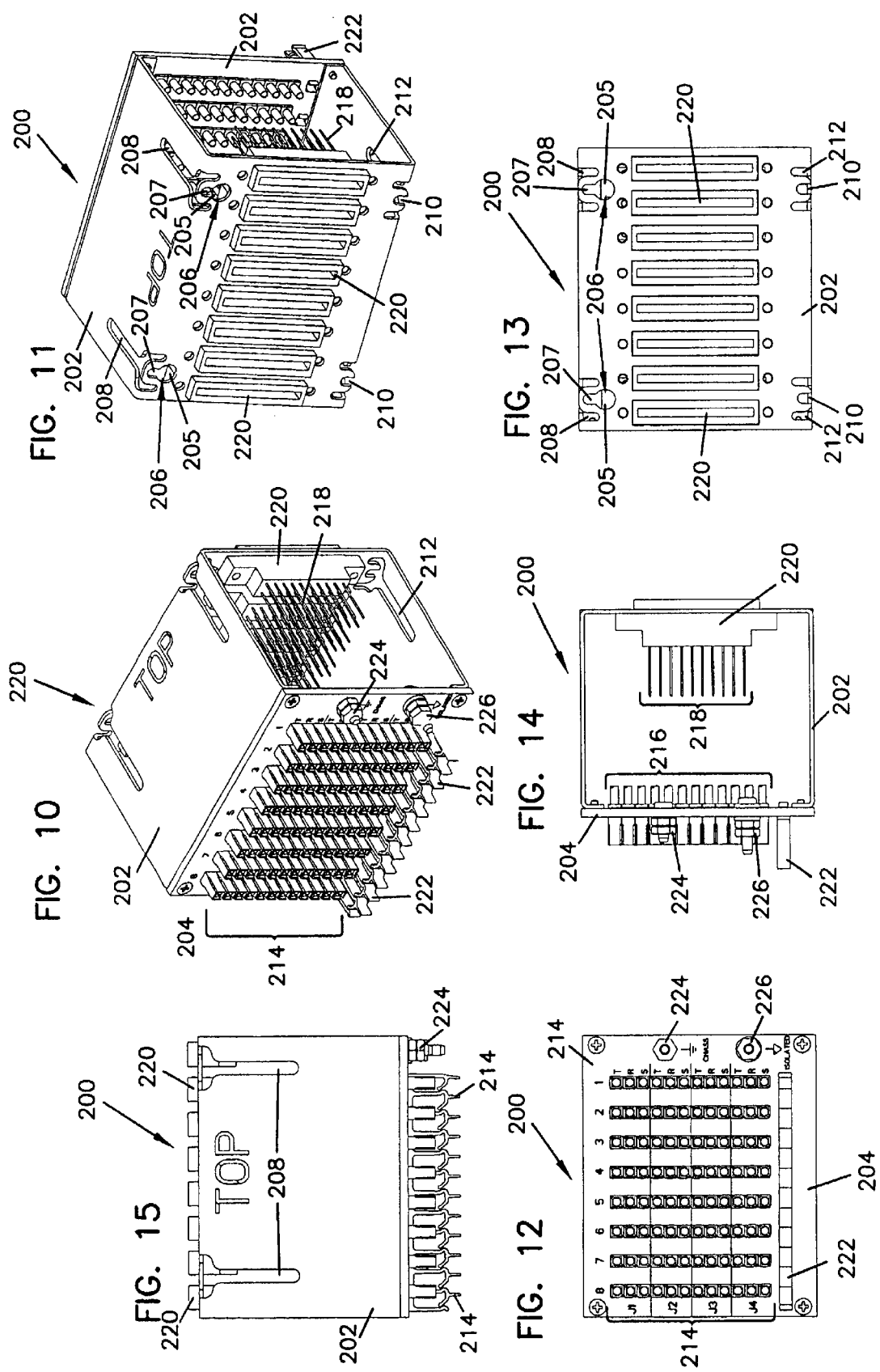

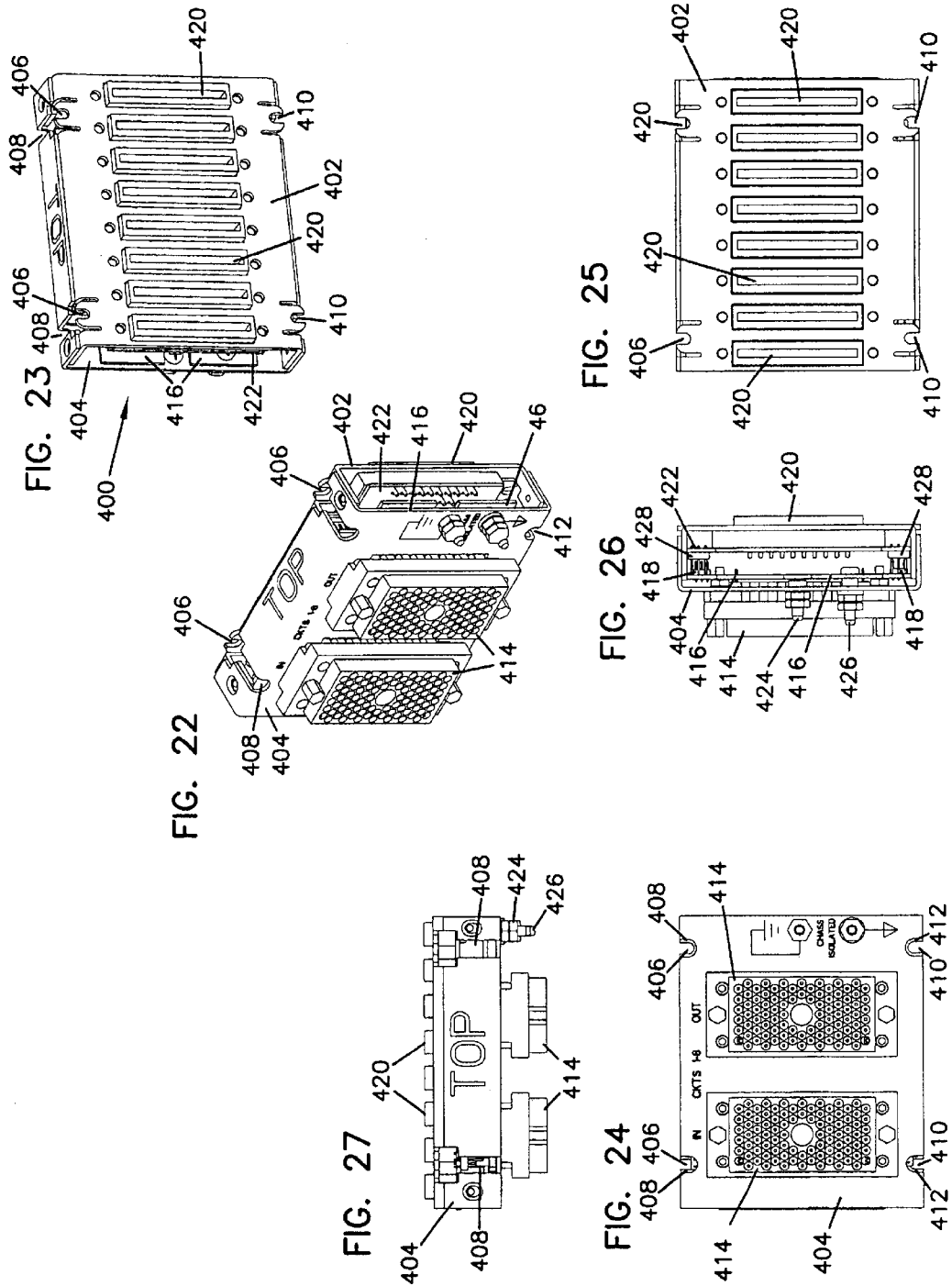

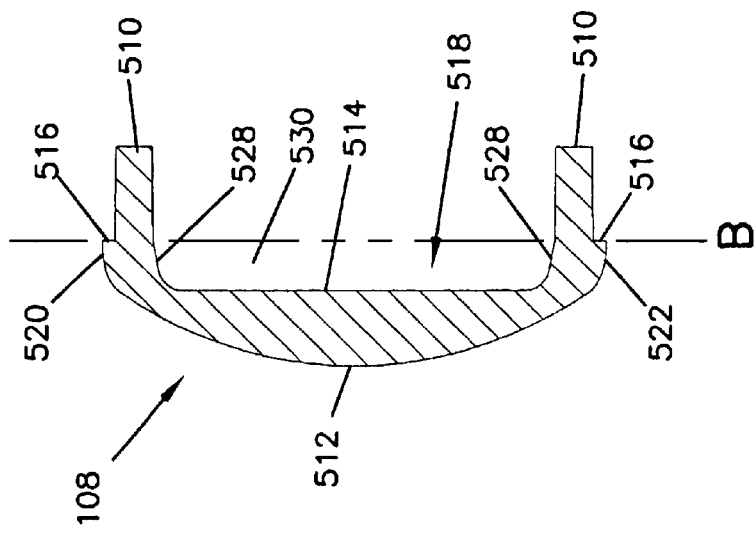
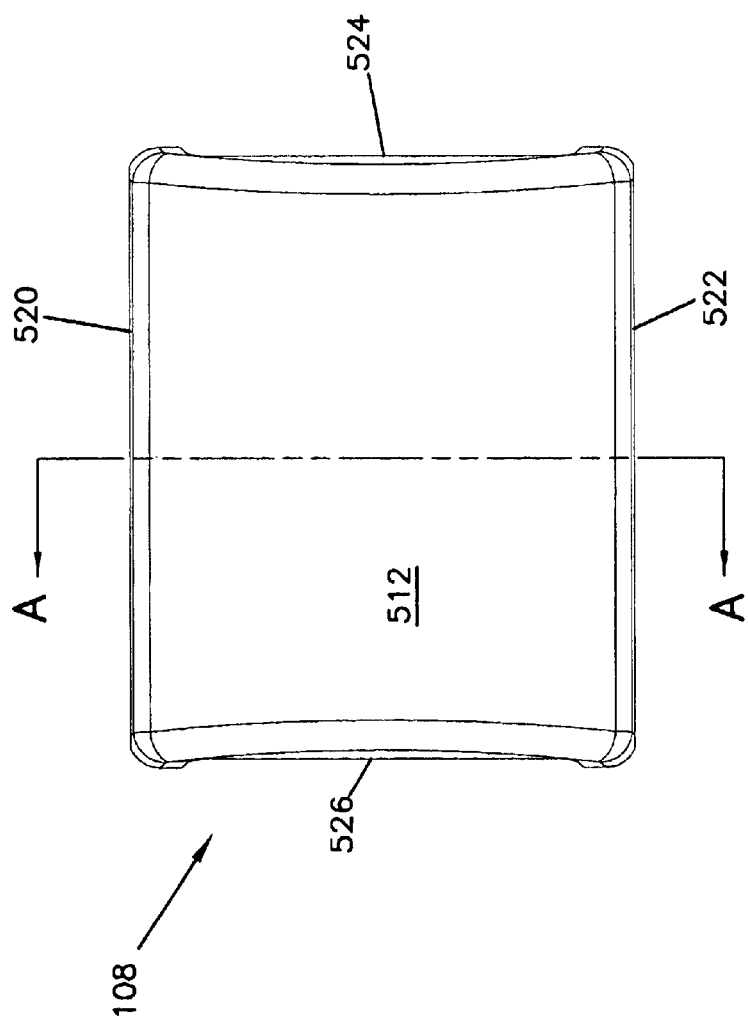

ELECTRONIC SIGNAL TRANSMISSION AND SWITCHING JACK

FIELD OF THE INVENTION

The present invention relates to electronic signal transmission and switching. More specifically, the present invention relates to multi-function, multi-circuit switching jack modules for the audio, broadcast and entertainment industries.

BACKGROUND OF THE INVENTION

Analog and digital audio signals are transmitted over balanced and shielded twisted pair cables. These cables include a pair of insulated conductors, either stranded or solid wire, which are surrounded by a metal foil shield. The shield serves to reduce the impact of external electromagnetic inference on the signal being transmitted over the cable and also to reduce the electromagnetic field generated by the signals being transmitted over the cable.

In a professional audio and video industry application, a large number of such cables will be in use to carry signals from sources to processing devices such as mixers or equalizers and further to amplifiers or other downstream devices. The environment in which these signals are generated is quite dynamic and requires the ability to quickly and easily shift connections between sources, and and downstream devices. A jack field provides this sort of connection flexibility. A jack field allows incoming signals to be patched into circuits connected to devices and signals returning from devices to be patched into circuits connected to downstream devices. Each jack in this jack field requires three conducting paths, two for the balanced audio signal and one for the shield to serve as a grounding path. There are three principal ways to connect these jacks to one another, depending on the needs of the particular situation.

First, a jack field may be set up for non-normal connections, meaning that each jack is connected directly to another jack. When a connection between devices is needed, a patch cord must be used. For example, a source is connected to J1 and J1 is electronically linked to jack 1. A device is connected to J1 and J2 is electronically linked to jack 2. To link the source to the device, a patch cord would be used to electronically link jack 1 to jack 2, as shown in FIG. 28b. Without a patch cord in place in jack 1 or jack 2, no connection will exist for either the source or the device, as shown in FIG. 28a.

A second method of connecting jacks is referred to as normal. As an example, a source and an device are designated to be linked together electronically as a default or normal condition, but it is still necessary to be able to switch the source to another device, or connect another source to the device, on occasion. To accomplish this, a source is connected to J1 and an device is connected to J2. J1 is also electronically connected to J2. Jacks 1 and 2 are placed in the circuit connecting J1 and J2, as shown in FIG. 29a, and are configured such that, if a patch cord is inserted into jack 1 or jack 2, the connection between J1 and J2 is broken, as shown in FIG. 29b. If a patch cord is inserted into jack 1, it will not only break the J1–J2 connection, but the patch cord will be electronically linked to the source connected to J1. Similarly, a patch cord inserted into jack 2 will break the J1–J2 connection and be electronically linked with the device connected to J2. So, in a normal configured jack field, two elements can be configured to be normally electronically connected to one another but that normal connection can be broken and the connections redirected as necessary.

A third method of connecting jacks is referred to as half-normal. In the default state, a source connected to J1 and an device connected to J2 are connected together through jack 1 and jack 2, as shown in FIG. 30a. This arrangement allows, for example, the feed coming from a source to J1 to be monitored by a device connected into the normal circuit by a patch cord inserted into jack 1 without the insertion of the patch cord into jack 2 causing the connection between the source and the device connected to J2 to be broken, as shown in FIG. 30b. In addition, the connection between the source and the device can be broken by the insertion of a patch cord in jack 2. When a patch cord is inserted into jack 2, the patch cord in jack 1 can then be used to patch the source to another device and patch cord in jack 2 can be used to patch another source to the device, as shown in FIG. 30c.

Another aspect of the connection between jacks and devices connected to the jacks is the treatment of the shield. Typically, the shield of the cable connected to the first jack is electronically linked to the shield of the cable connected to the second jack when the first jack and the second jack are electronically linked. It is desirable to have the ability to link the shields either individually or jointly to a common ground. This allows maximum flexibility in the configuration in the electronic linkages between the jacks, depending on the devices connected to the jacks.

While these connection schemes within a jack field are known, the ability of users to reconfigure a jack field or a jack pair within a jack field from one to another of the three arrangements could be improved. A variety of approaches have been used in the past, including wire wrapping leads together between the jacks, soldering the leads together between the jacks, using straps or jumpers to reconfigure connections between jacks, or using small metal plates of different sizes and shapes to reconfigure the connection between jacks. In some designs, the entire jack field would need to be exchanged to reconfigure the arrangement. This type of design does not allow the users to configure the circuits connected to individual devices and required all devices connected to a particular jack field to be configured identically. Improvement to the ability to create and modify the state of the connection between jacks and individual devices in the jack fields is desirable.

In addition, users of these types of devices and jack fields have very complex and dense wiring environments within their physical plants. Improvement to the density of connections possible in the limited space available within their physical plant without a loss of flexibility of configuration is desirable.

SUMMARY OF THE INVENTION

The present invention relates to switching circuits such as for an audio signal transmission environment. One aspect of the invention is a switching module which contains pairs of audio jacks for receiving audio plugs and circuitry connecting these jacks to a second set of connectors. Included in the circuitry are two position switches which allow the switching module to be configured for several different switching conditions.

A further aspect of the invention is a method of configuring the switches to provide straight through, normal and half normal connections between the audio jacks and the second set of connectors.

A further aspect of the invention is a system including a chassis, with switching modules and connecting modules, the connecting modules electronically linking audio cables connected to the connecting modules to cables connected to audio plugs inserted into audio jacks of the switching modules.

A variety of advantages of the invention will be set forth in part and the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows:

FIG. 4 is second perspective view of the switching module of FIG. 3.

FIG. 9 is a switching legend for the switching module of FIG. 4.

FIG. 10 is a first perspective view of one of the connecting modules of FIG. 2.

FIG. 11 is a second perspective view of the connecting module of FIG. 10.

FIG. 12 is a view of the cable connection side of the connecting module of FIG. 10.

FIG. 13 is a view of the switching module connecting side of the connecting module of FIG. 10.

FIG. 14 is an end view of the switching module of FIG. 10.

FIG. 15 is a top view of the switching module of FIG. 10.

FIG. 22 is a first perspective view of a third connecting module of FIG. 2.

FIG. 23 is a second perspective view of the connecting module of FIG. 22.

FIG. 24 is a view of the cable connection side of the connecting module of FIG. 22.

FIG. 25 is a view of the switching module connecting side of the connecting module of FIG. 22.

FIG. 26 is an end view of the switching module of FIG. 22.

FIG. 27 is a top view of the switching module of FIG. 22.

FIG. 35 is a rear view of the designation lens of FIG. 31.

FIG. 36 is a cross-sectional view of the designation lens of FIG. 31 taken along AA in FIG. 35.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
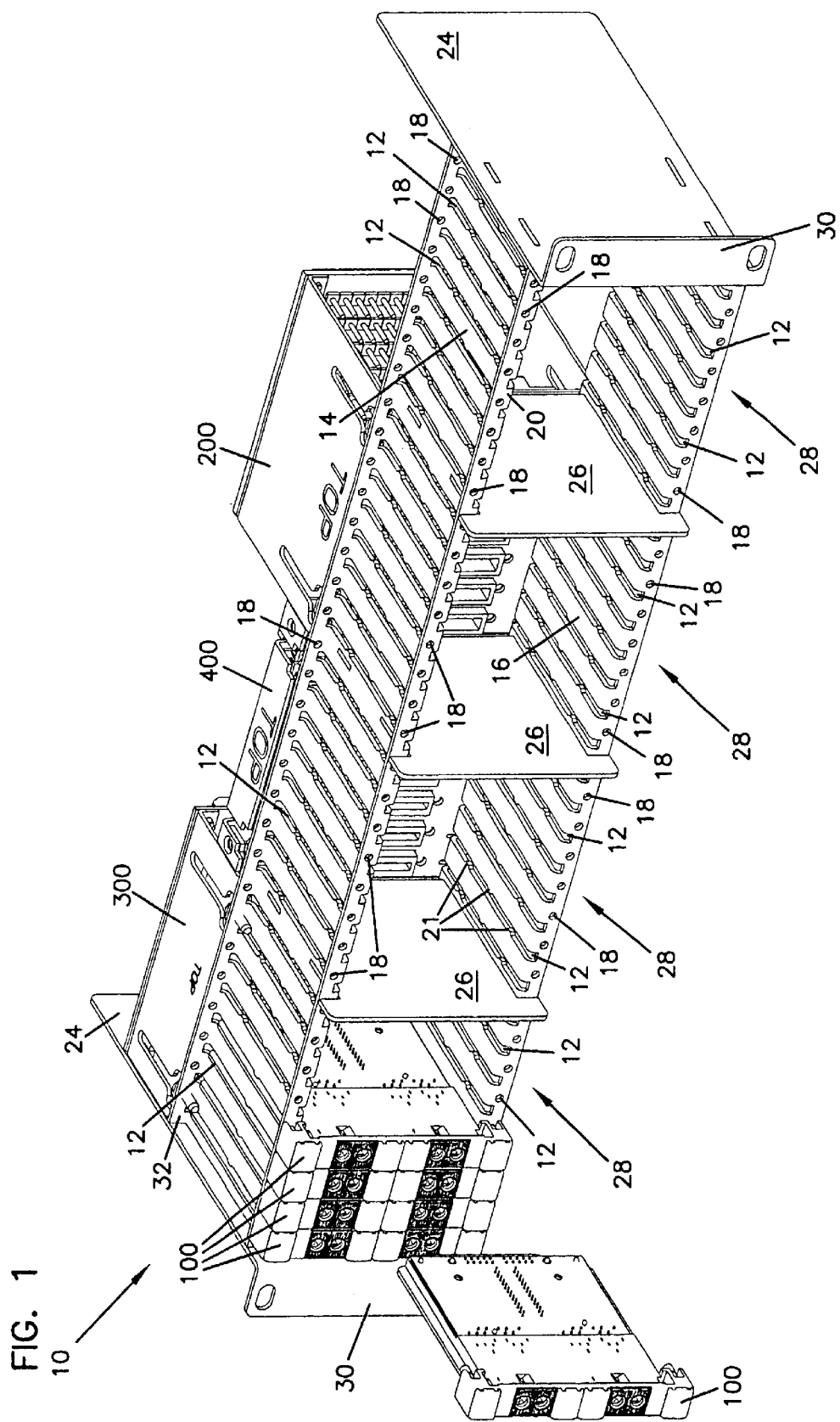
FIG. 1 is a perspective view of the first side of an audio signal transmission chassis with four switching modules mounted in the chassis and a fifth module in position for insertion into the chassis.

Referring now to FIG. 1, an audio signal transmission chassis 10 is shown with four switching modules 100 mounted within the chassis and a fifth switching module 100 in position to be inserted into chassis 10. Switching modules 100 are mounted by engaging card slots 12 in upper plate 14 and lower plate 16. Removable fasteners are then inserted through each module 100 and engaged by openings 18 in first upper plate flange 20 and first lower plate flange 22. The fasteners are not shown in FIG. 1 but may include any type of suitable removable fastener such as a screw. Chassis 10 comprises upper plate 14 and lower plate 16 which are joined to each other by end plates 24 and a series of intermediate plates 26. Mounting flanges 30 are included at the switching module end of sides 24. Mounting flanges 30 may be used to mount chassis 10 in a convenient location, such as in an equipment rack. End plates 24 and intermediate plates 26 cooperate to form switch module bays 28. Each bay 28 is configured to receive eight switching modules 100. Each bay 28 includes eight card slots 12 in both upper plate 14 and lower plate 16 and eight openings 18 in both upper plate flange 20 and lower plate flange 22 to allow the eight switching modules 100 to be mounted to the chassis. Projections 27 project transversely into slots 12 for centering modules 100.

Figure 2:
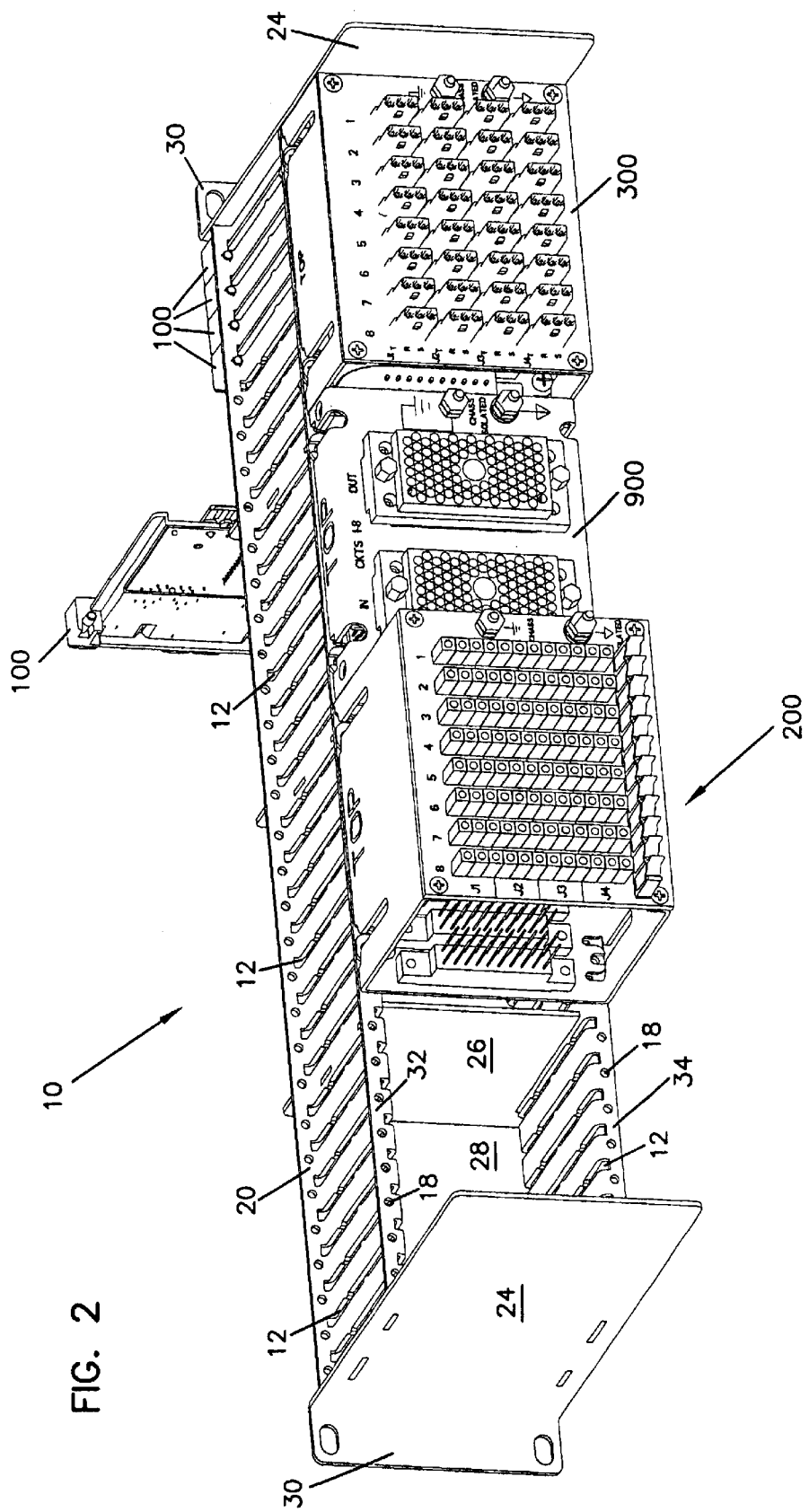
FIG. 2 is a perspective view of the second side of the chassis of FIG. 1, showing three connecting modules mounted in the chassis.
Figure 3:
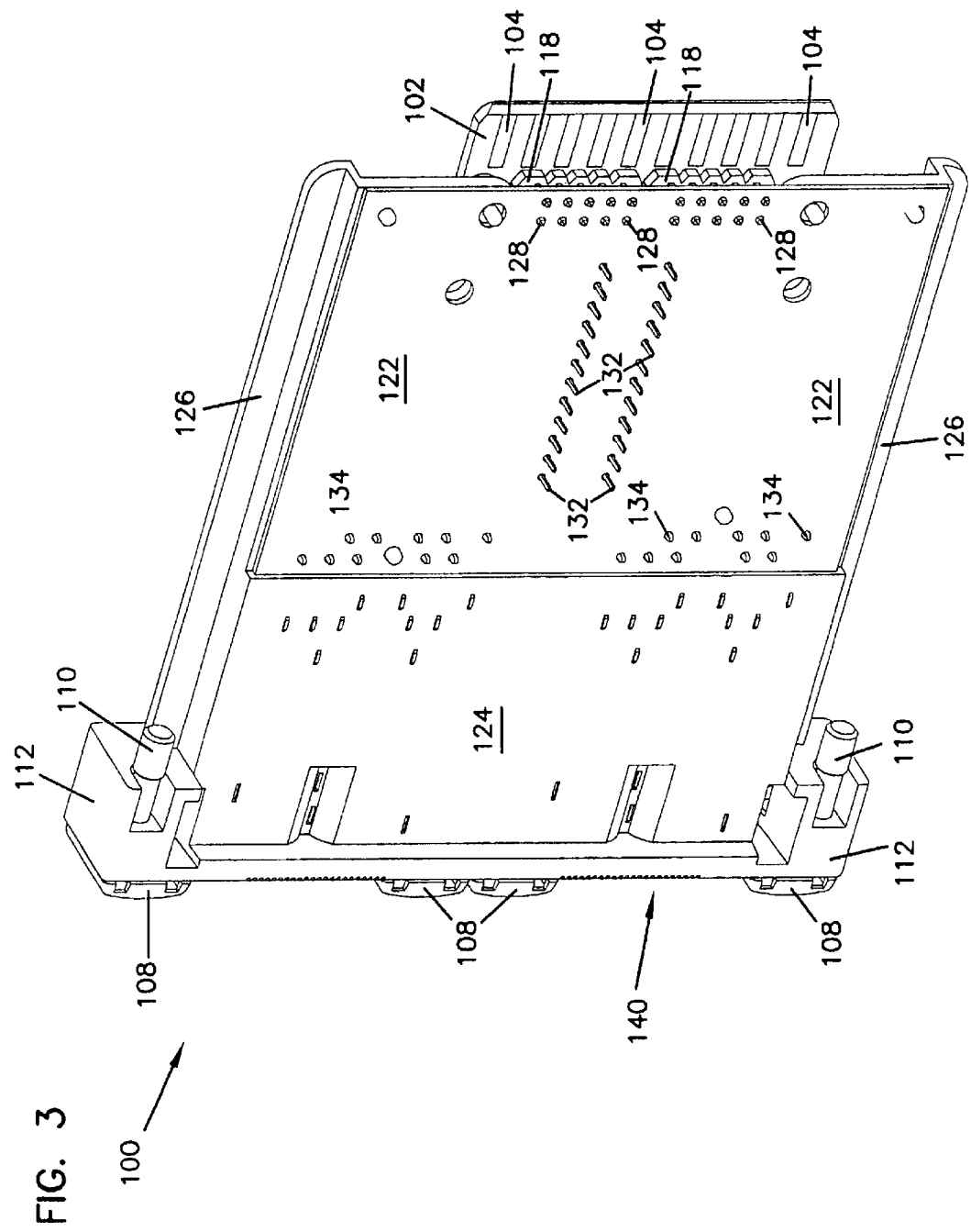
FIG. 3 is a first perspective view of one of the switching modules of FIG. 1.
Figure 6:
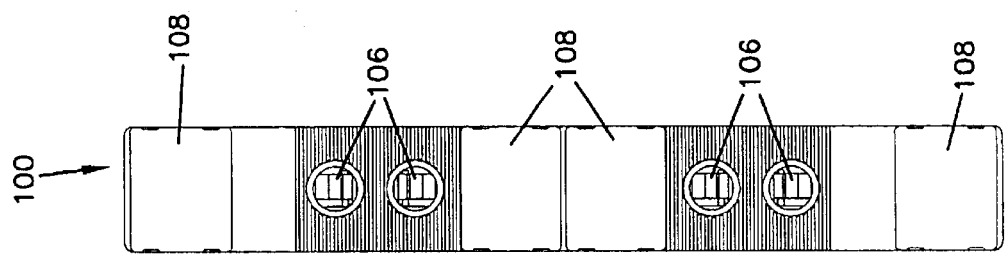
FIG. 6 is an end view of the switching module of FIG. 4.
Figure 5:
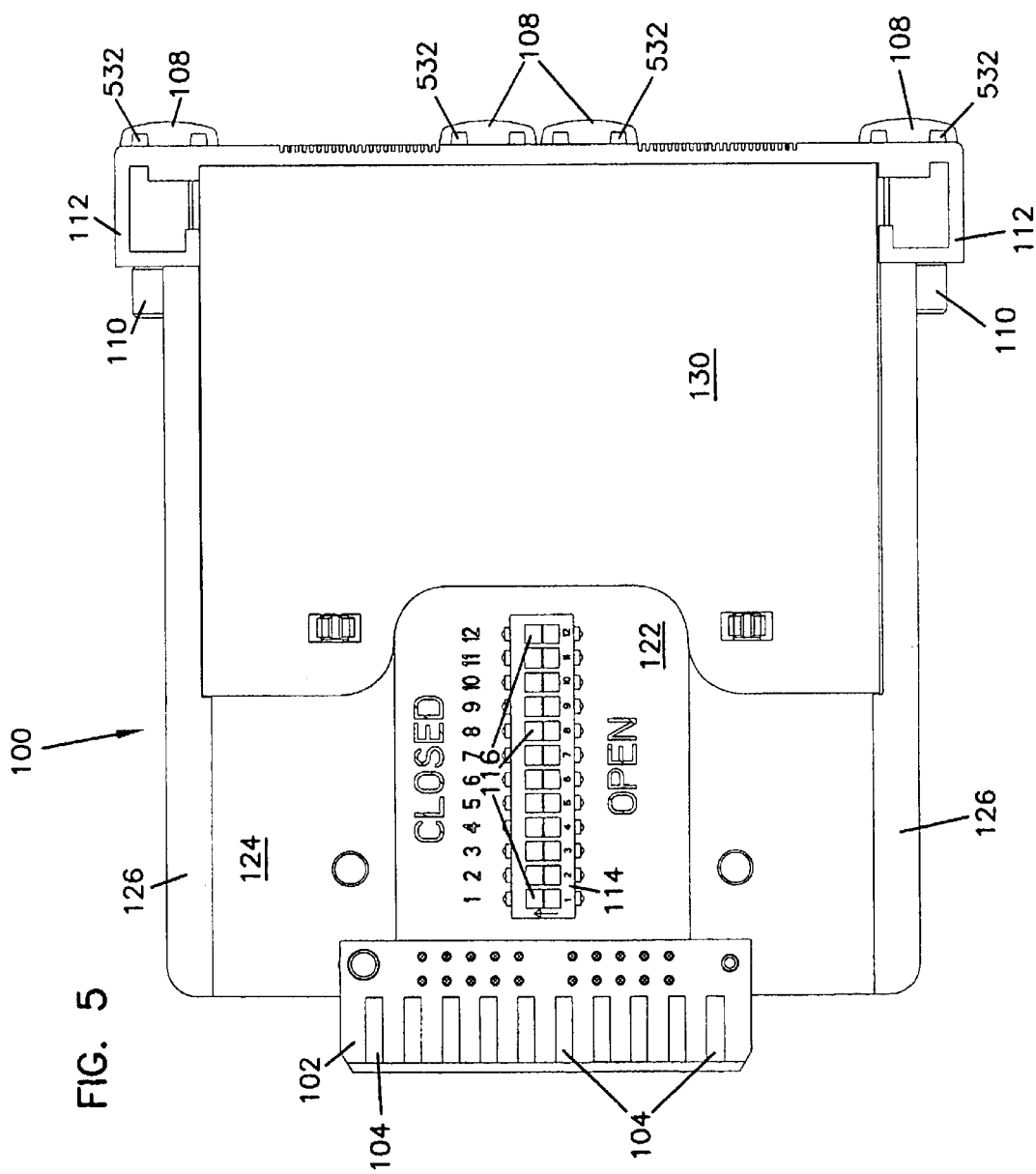
FIG. 5 is a side view of the switching module of FIG. 4
Figure 7:
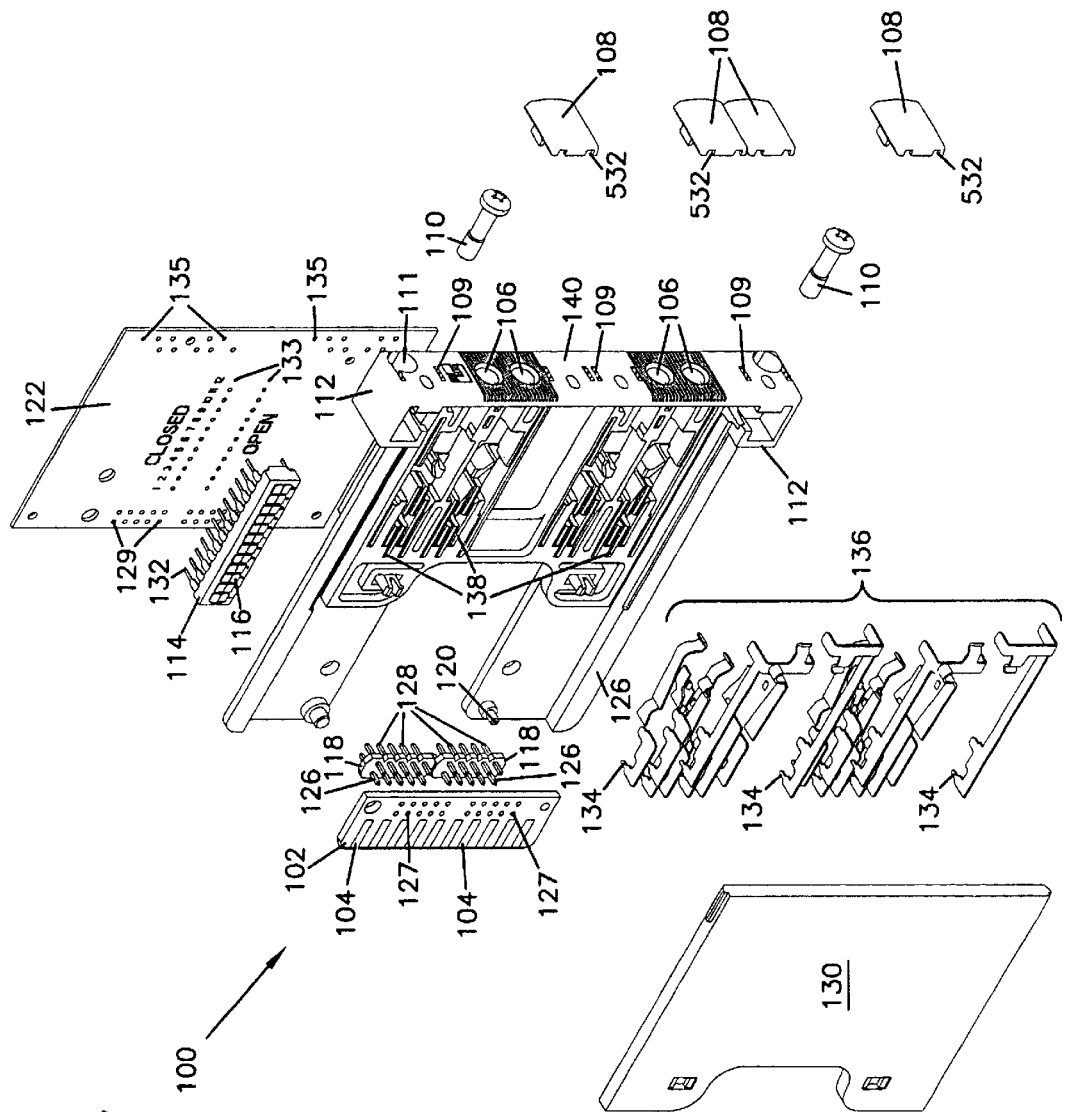
FIG. 7 is an exploded view of the switching module of FIG. 4.

Also mounted within each bay 28 of chassis 10 is a connecting module. Three different connecting modules 200, 300 and 400 are shown in FIG. 1. Different combinations of connecting modules 200, 300 and 400 can be used as desired. Further descriptions of switching module 100 and connecting modules 200, 300 and 400 are included below. A similar chassis to chassis 10 of FIGS. 1 and 2 is shown and described in U.S. Pat. No. 6,186,798. Further connecting modules are also shown and described in U.S. Pat. No. 6,186,798. Chassis 10 is also useable with the jack access cards or modules shown and described in U.S. Pat. No. 6,186,798. The disclosure of U.S. Pat. No. 6,186,798 is incorporated by reference. It is anticipated that module 100 can be adapted for use with a variety of standard and non-standard chassis and also in conjunction with other mounting systems.

Referring now to FIG. 2, a second perspective view of chassis 10 is shown. Connecting modules 200, 300 and 400 are mounted to chassis 10 with fasteners inserted through the connecting modules and into openings 18 in second upper plate flange 32 and second lower plate flange 34. The fasteners are not shown in FIG. 2 but may include any type of suitable removable fastener such as a screw.

Referring now to FIGS. 3 through 9, further details of switching modules 100 are shown. FIGS. 3 through 6 show an assembled switching module 100. A card edge connector plate 102 is provided for connecting to one of connecting modules 200, 300 or 400. Card edge connector plate 102 includes ten card edge contacts 104 on each side of plate 102, for a total of twenty possible card edge connections. Connectors 118 are used to electronically connect contacts 104 with circuitry on circuit board 122. Standoffs 120 are used to physically connect plate 102 to jack housing 124. Each of the ten posts 128 that are part of each connector 118 extends through a hole 127 in plate 102 and is electronically connected to a single contact 104. Each of the ten posts 128 that are part of each connector 118 extends through a hole 129 in circuit board 122 and is electronically connected to a circuit on board 122. These circuits will be described in detail below but are not shown in FIGS. 3 through 9 for clarity. Offsetting of card edge plate 102 allows module 100 to be used in the arrangement described in U.S. Pat. No. 6,186,798. While modules 100 can be used in a variety of environments to support audio patching, the utility of these modules is enhanced by ensuring interchangeability with an existing rack system such as described in the '798 patent.

A switch bank 114 with twelve switches 116 is mounted to circuit board 122 with switch contacts 132 extending through holes 133. Each switch 116 has two positions, open and closed. Switches 116 can be either sliding or rocker switches or some other form of two position switch appropriate for mounting on a circuit board. Switches 116 may sometimes be referred to as DIP switches. Switch contacts 132 are linked into the circuitry on circuit board 122. The circuitry on circuit board 122 also is electronically linked with spring contacts 134 which extend through holes 135 in circuit board 122. The circuitry on circuit board 122 will be described in detail below. Each of these spring contacts 134 is part of a spring 136 which is received in a slot 138 of jack housing 124. The configuration and function of springs 136 will be described below in the description of the circuitry of module 100. Spring cover 130 encloses springs 136 and slots 138.

On an opposite side of switching module 100 from card edge contacts 104 are four audio jacks 106 positioned with access openings along face 140 of jack housing 124 which are sized to receive bantam audio plugs (not shown). It is anticipated that other types of jacks and plugs may be utilized with module 100. A bantam audio plug for use with module 100 has tip, ring and shield contacts which are attached to the tip, ring and shield conductors of a shielded audio cable. When a bantam audio plug is inserted into a jack 106, the tip, ring and shield contacts of the plug come into contact with selected springs 136 and thus to the circuitry of switching module 100. At either end of face 140 are mounting extensions 112 through which are holes 111 for receiving fasteners 110. Fasteners 110 cooperate with openings 18 of chassis 10 for mounting switching modules 100 to chassis 10. On face 140 adjacent to each jack 106 are designation devices 108. In the preferred embodiment, each designation device 108 is at least partially transparent to visible light and holds indicia of the circuit linked to an adjacent jack opening 106. Additional details of designation devices 108 are provided below. Extending from jack housing 124 are tabs 126. Tabs 126 are sized and shaped to engage slots 12 in chassis 100 so that a module 100 can be slid into a bay 28 for mounting with fasteners 110 into openings 18 in first upper plate flange 20 and first lower plate flange 22.

Figure 8:
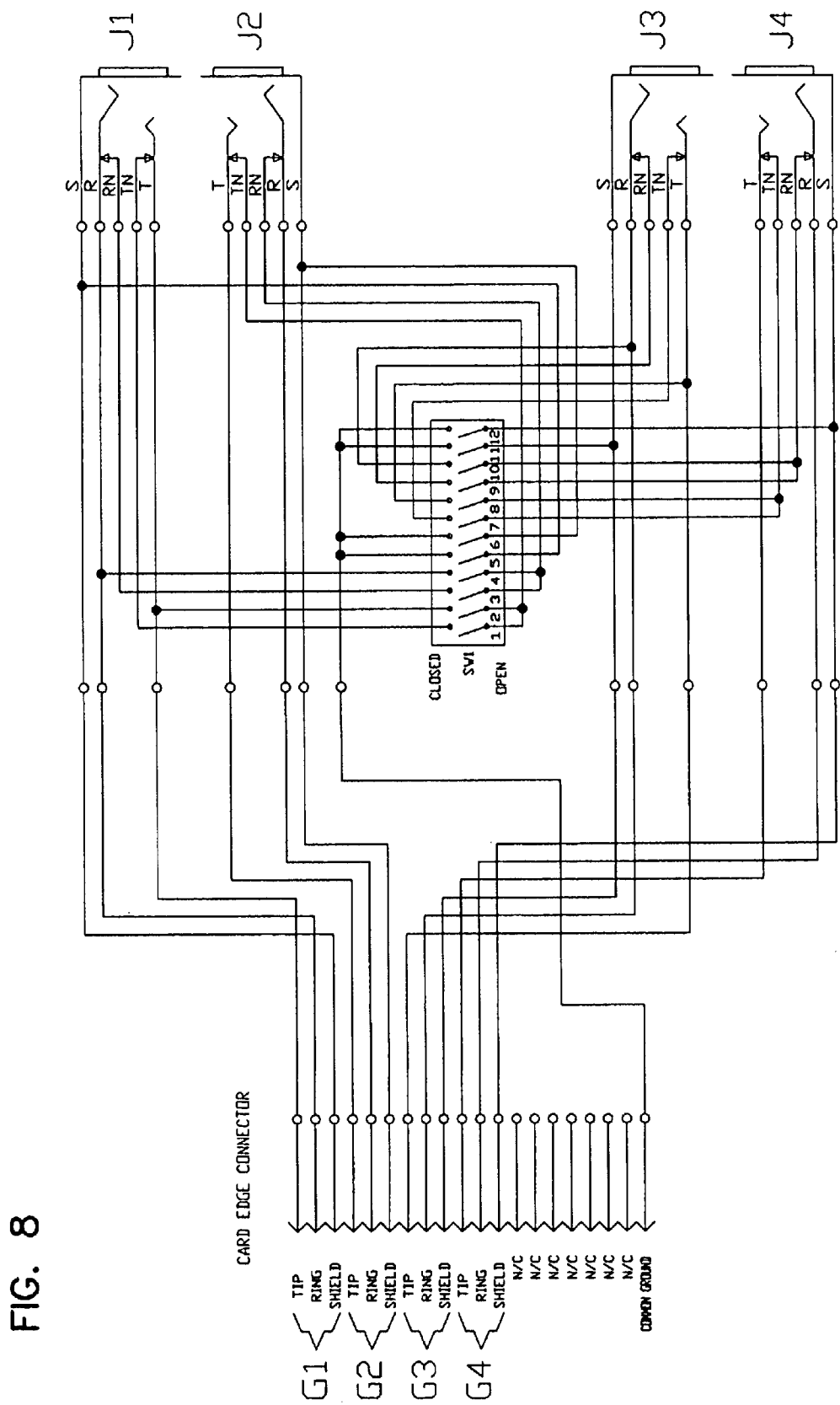
FIG. 8 is a circuit diagram of the switching module of FIG. 4.
Figure 17:
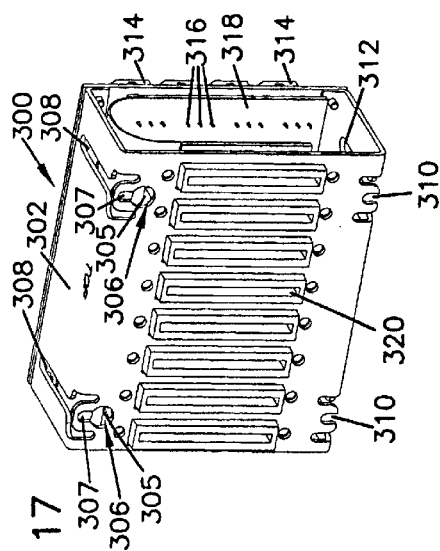
FIG. 17 is a second perspective view of the connecting module of FIG. 16.
Figure 16:
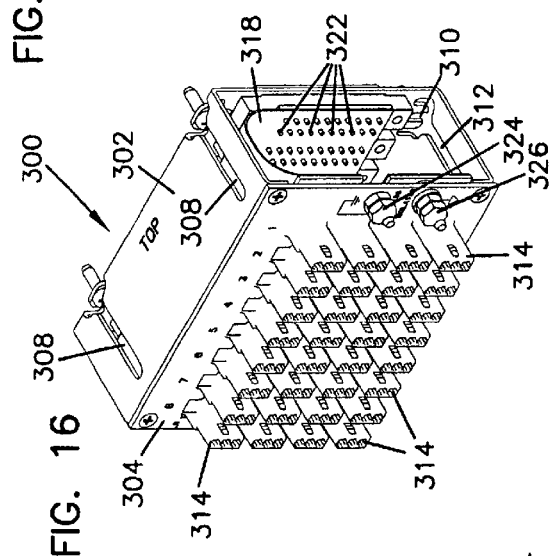
FIG. 16 is a first perspective view of a second connecting module of FIG. 2.
Figure 21:
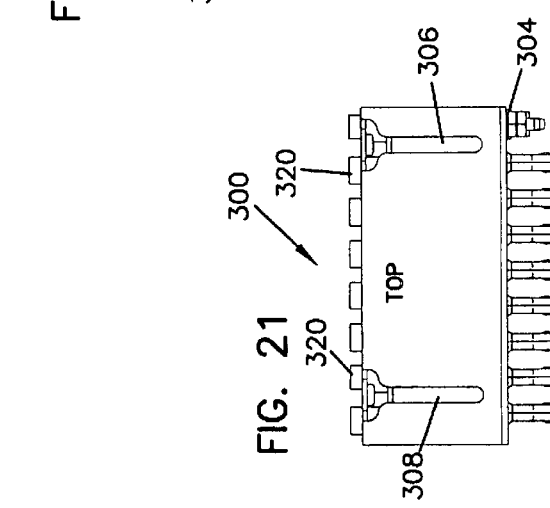
FIG. 21 is a top view of the switching module of FIG. 16.
Figure 19:
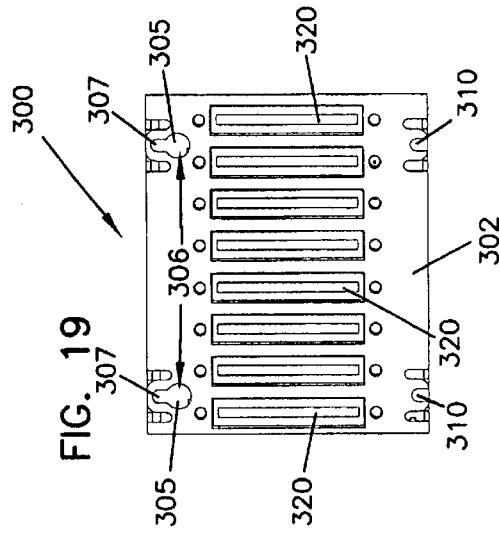
FIG. 19 is a view of the switching module connecting side of the connecting module of FIG. 16.
Figure 20:
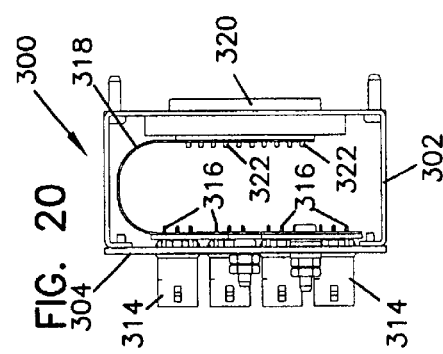
FIG. 20 is an end view of the switching module of FIG. 16.
Figure 18:
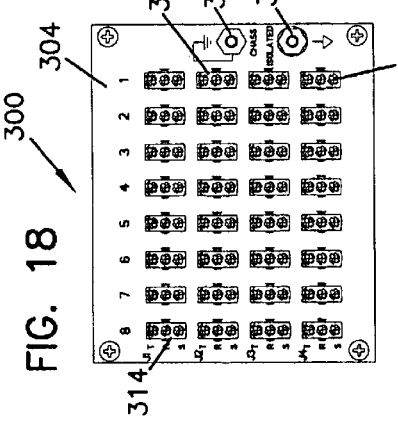
FIG. 18 is a view of the cable connection side of the connecting module of FIG. 16.
Figure 28A:
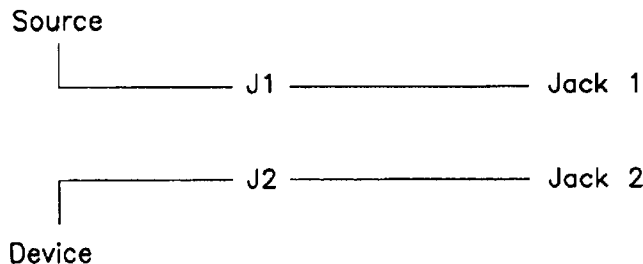
FIG. 28a is a diagram of a prior art non normal circuit without a patch cord.
Figure 28B:
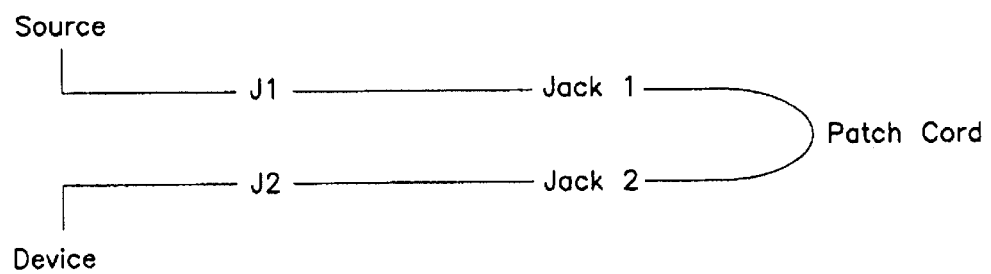
FIG. 28b is a diagram of a prior art non normal circuit with a patch cord.
Figure 29A:
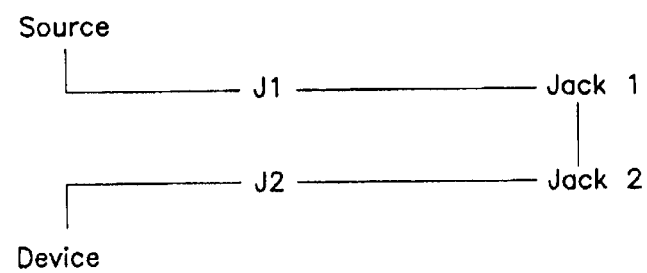
FIG. 29a is a diagram of a prior art full normal circuit without a patch cord.
Figure 29B:
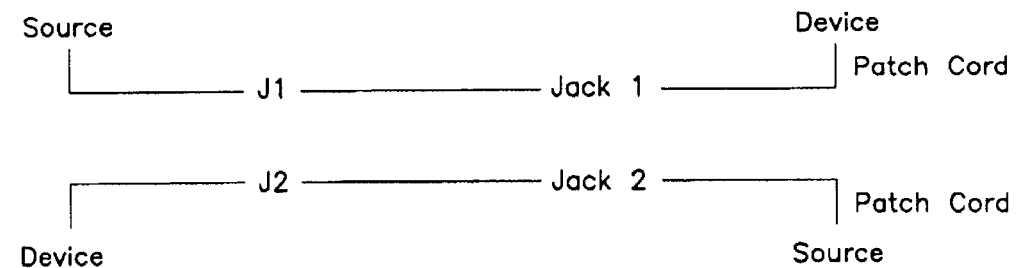
FIG. 29b is a diagram of a prior art full normal circuit with a patch cord.
Figure 30A:
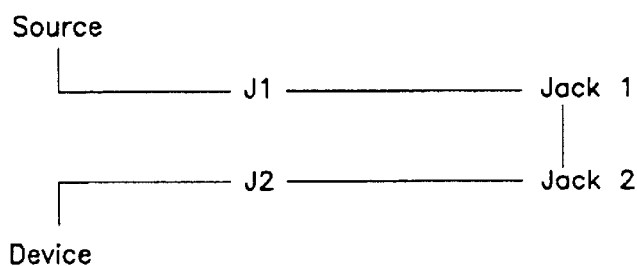
FIG. 30a is a diagram of a prior art half normal circuit without a patch cord.
Figure 30B:
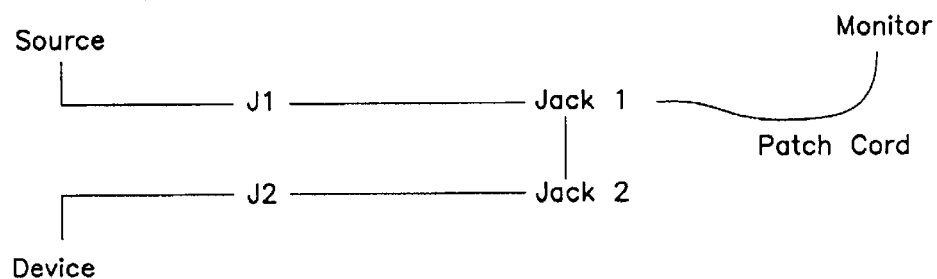
FIG. 30b is a diagram of a prior art half normal circuit with a monitor connected with a patch cord.
Figure 30C:
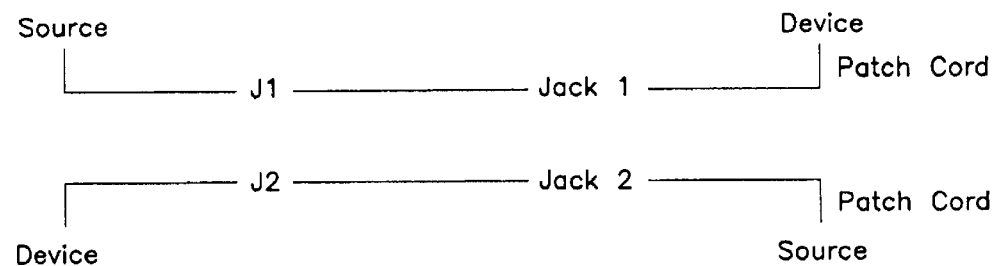
FIG. 30c is a diagram of a prior art half normal circuit with a patch cord.
Figure 31:
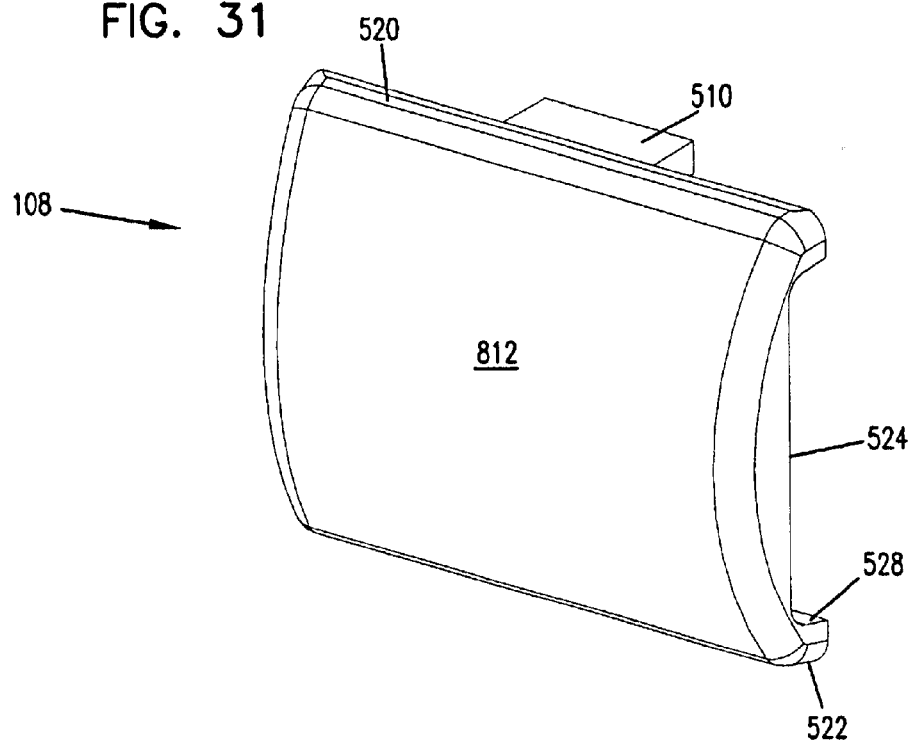
FIG. 31 is a front perspective view of an alternative designation lens for holding indicia.
Figure 33:
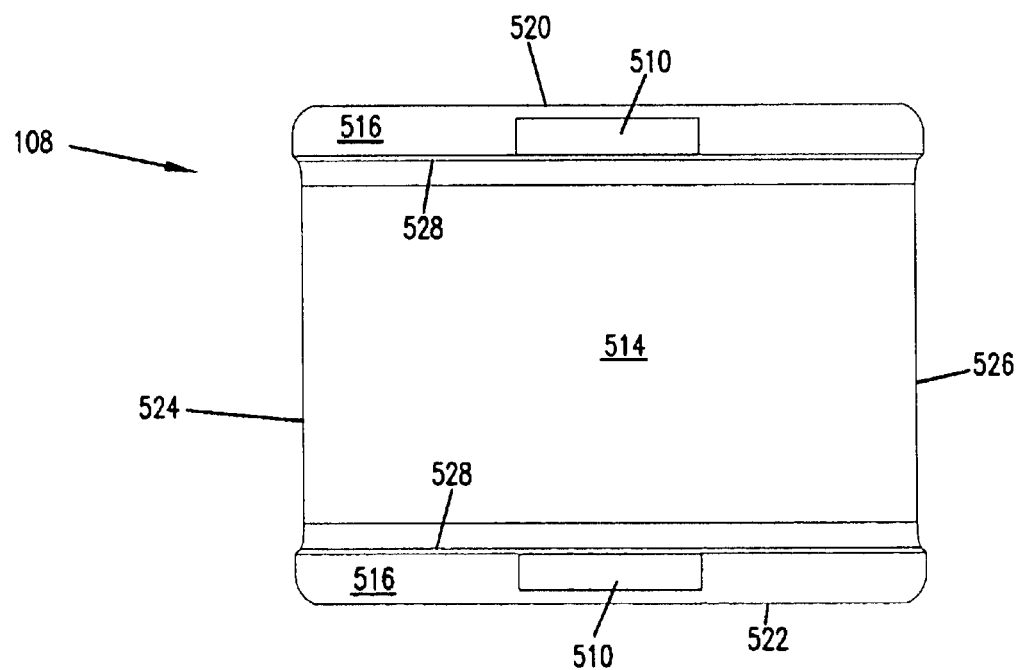
FIG. 33 is a rear view of the designation lens of FIG. 31.
Figure 32:
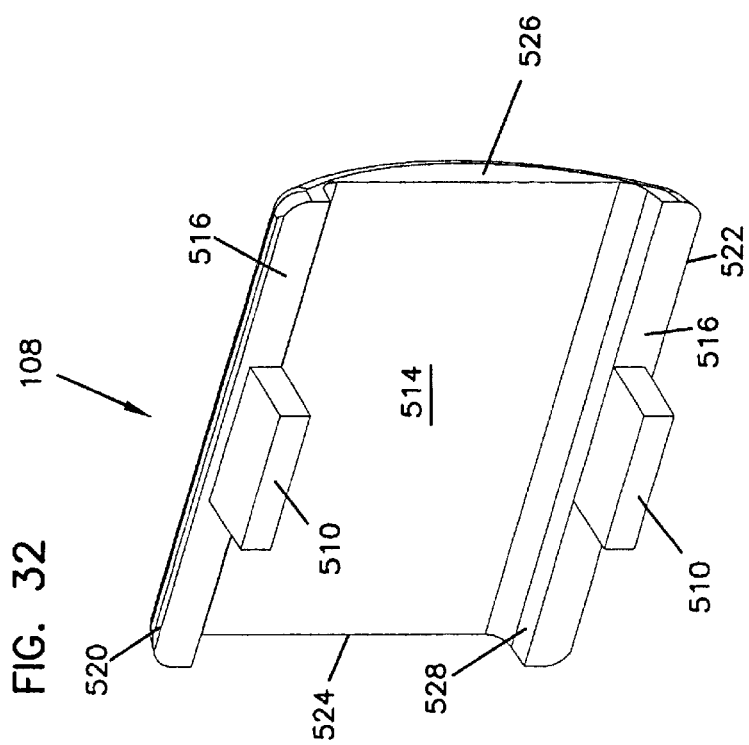
FIG. 32 is a rear perspective of the designation lens of FIG. 31.
Figure 34:
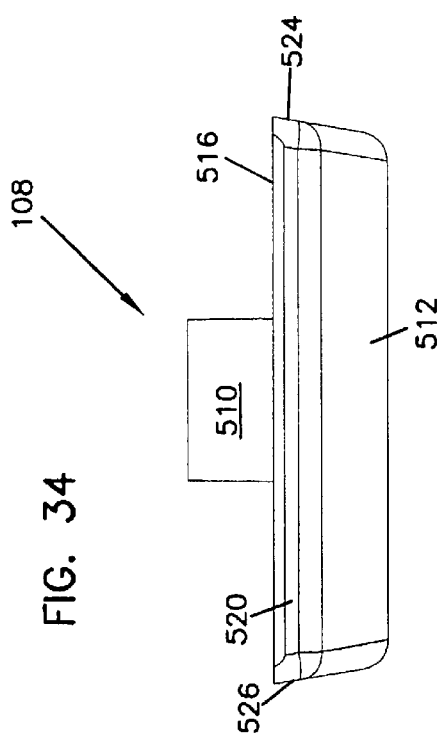
FIG. 34 is a top view of the designation lens of FIG. 31.

Referring now to FIG. 8, the wiring schematic of the circuitry of module 100 and the configuration of springs 136 is shown. J1, J2, J3 and J4 represent the jack openings 106 through face 140 of module 100. Without a plug inserted into jack opening 106, a normal connection exists between the springs labeled R and RN and between the springs labeled T and TN. When a bantam audio plug is inserted into one of the jack openings 106, springs labeled T and R are displaced, breaking the connection with springs TN and RN, respectively. When the plug is fully inserted into jack opening 106, the tip, ring and shield contacts of the plug are electronically connected with the springs labeled T, R and S, respectively. Card edge connectors 104 are grouped into four groups, G1, G2, G3 and G4, each group including a tip connector, a ring connector and a shield connector. Through the connection modules 200, 300 and 400 described below, each group of three card edge connectors is connected to a shielded cable leading to an audio source or other audio signal device. As shown in switching module 100, only thirteen card edge connections 104 are used, one for each T, R and S spring in jacks J1, J2, J3 and J4, and one to act as a common ground.

Referring now to FIGS. 8 and 9, the operation of switches 116 to change the configuration of switching module 100 can be seen. Module 100 can be configured in three different conditions: no normal, half normal and full normal. To configure module 100 to a no normal condition, all switches 116 are left open. This condition has no normal state connections between any of G1, G2, G3 or G4. The only way a cable linked to G1 connectors can be linked to a cable linked to G2 connectors is through the use of a patch cord with audio bantam plugs inserted into J1 and J2. To configure module 100 to a full normal condition, switches 116 labeled 1, 3, 7 and 9 are closed, with the remaining switches left open. This full normal condition allows a default electronic connection between G1 and G2, and between G3 and G4, when no plugs are present in J1, J2, J3 and J4. For example, assume G3 is linked to an audio source and this audio source is normally used in conjunction with a particular audio effects device linked to G4. Without an audio plug in either J3 or J4, this normal connection exists. When an alternative connection is required, patch cords can be inserted in J3 and J4 to disconnect the source and the effects device from each other and patch them into other circuits.

To configure module 100 to a half normal condition, switches 116 labeled 2, 4, 8 and 9 are closed and the remaining switches are left open. This condition also provides a default electronic connection between G1 and G2, and G3 and G4. In this half normal condition, an audio plug inserted into J1 or J3 will permit another device or monitor to be linked into the default circuit without breaking the circuit. If it is desirable to break the default circuit and patch the attached devices to alternative circuits, inserting patch cords into J2 and J4 will serve to break the normal circuits and allow patching to be carried out.

As shown in FIG. 8, the shield connectors of G1, G2, G3 and G4 are connected directly to the springs labeled S in J1, J2, J3 and J4, which will in turn contact the shield contact of an audio plug inserted into the jack. In some situations, it is desirable to have the shield connections also tied into a common ground or shield buss. Switches 116 labeled 5, 6, 11 and 12 allow the shield circuit between G1 and J1, G2 and J2, G3 and J3, and G4 and J4, respectively, to be tied into the common ground.

Referring now to FIGS. 10 through 27, connecting modules 200, 300 and 400 will be described. The role of connecting modules 200, 300 and 400 is to electronically link card edge contacts 104 to audio cables. These connecting modules are flexible in terms of the connectors they provide for linking to these audio cables and the nature of the internal connection between the card edge contacts and the rear connectors. Three alternatives each of cable connectors and internal connection are illustrated by modules 200, 300 and 400. All three of the module alternatives include card edge slots for receiving card edge plates 102 and electronically linking with card edge contacts 104. Additional alternative versions of connecting modules are shown in the above-referenced U.S. Pat. No. 6,186,798.

Referring now to FIGS. 10 through 15, module 200 includes insulation displacement connectors (IDCs) 214 for linking to individual conductors within audio cables and utilizes wire wrap tails 218 within the module to link the card edge connectors to the IDCs 214. Module 200 includes a C-shaped, open-ended housing 202, which also serves as the mounting surface for card edge slots 220. Card edge slots 220 serve to interface with card edge plates 102 of modules 100 and include contacts which electronically link card edge contacts 104 with wire wrap tails 218. In housing 202 are mounting openings 206 and 210 for mounting module 200 to chassis 10 with fasteners inserted through openings 206 and 210 and into openings 18 in second upper plate flange 32 and second lower plate flange 34. Openings 206 include a larger lower opening 205 and a smaller upper opening 207 for passage of a fastener head and shaft, respectively. Openings 210 are configured as downward facing slots. Even though the ends of module 200 are open, access to the fasteners for mounting or removal from a chassis 10 may be difficult, since multiple modules 200, 300 and 400 may be mounted side-by-side, blocking the open ends. Upper access slots 208 and lower access slots 212 allow users to see and engage the fasteners, such as with a screwdriver, even when additional modules are mounted alongside module 200.

Mounted across the open end of housing 202 is plate 204. Plate 204 serves as the mounting surface for IDCs 214, which are located in eight vertical columns corresponding to the eight card edge slots 220 mounted to housing 202. Each row of IDCs 214 includes twelve individual connectors, for a total of 96 possible connections. Since audio cables include three conductors each, tip, ring and shield, a total of thirty-two cable connections are possible with module 200. Each IDC 214 is linked through plate 204 to a connecting post 216 within housing 202. Links are made between wire wrap tails 218 and connecting posts 216 with individual wires. Since a total of 96 wires linking posts 216 and wire wraps tails 218 are possible within housing 202, these wires have been omitted from the FIGS. for clarity. Wire organizers 222 are provided below IDCs 214 for collecting and organizing the audio cables attached to module 200. Also mounted on plate 204 are two separate grounds 224 and 226. Ground 224 is a common chassis ground and ground 226 provides an isolated ground. Card edge contact 104 designated to be the common ground contact will be linked to one or the other of these two grounds by a wire from the corresponding wire wrap connector 218, depending on wiring requirements of a particular application.

Referring now to FIGS. 16 through 21, module 300 includes 3-pin connectors 314 for linking to individual conductors within audio cables and utilizes flex-circuit 318 within the module to link the card edge connectors to the 3-pin connectors 314. Module 300 includes a C-shaped, open-ended housing 302, which also serves as the mounting surface for card edge slots 320. Card edge slots 320 serve to interface with card edge plates 102 of modules 100 and include contacts which electronically link card edge contacts 104 with posts 322. In housing 302 are mounting openings 306 and 310 for mounting module 300 to chassis 10 with fasteners inserted through openings 306 and 310 and into openings 18 in second upper plate flange 32 and second lower plate flange 34. Openings 306 include a larger lower opening 305 and a smaller upper opening 307 for passage of a fastener head and shaft, respectively. Openings 310 are configured as downward facing slots. Even though the ends of module 300 are open, access to the fasteners for mounting or removal from a chassis 10 may be difficult, since multiple modules 200, 300 and 400 may be mounted side-by-side, blocking the open ends. Upper access slots 308 and lower access slots 312 allow users to see and engage the fasteners, such as with a screwdriver, even when additional modules are mounted alongside module 300.

Mounted across the open end of housing 302 is plate 304. Plate 304 serves as the mounting surface for 3-pin connectors 314, which are located in eight vertical columns corresponding to the eight card edge slots 320 mounted to housing 302. Each row of 3-pin connectors 314 includes 4 connectors, each with 3 connections, for a total of 96 possible connections. Since audio cables include three conductors each, tip, ring and shield, a total of thirty-two cable connections are possible with module 300. Each 3-pin connector 314 is linked through plate 304 to a connecting post 316 within housing 302. Links are made between posts 322 and connecting posts 316 with flex circuit 318, which is a printed circuit board created from flexible materials which enable it to be shaped as shown in the FIGS. Also mounted on plate 304 are two separate grounds 324 and 326. Ground 324 is a common chassis ground and ground 326 provides an isolated ground. Card edge contact 104 designated to be the common ground contact will be linked to one or the other of these two grounds by a circuit path on flex circuit 318 from corresponding post 322, depending on wiring requirements of a particular application.

Referring now to FIGS. 22 through 27, module 400 is a more compact connection module utilizing board-to-board circuit connectors and 90-pin connectors to link switching modules 100 to audio cables. Module 400 includes housings 402 and 404. Housing 402 holds card edge slots 420 and housing 404 holds 90-pin connectors 414. Card edge slots 420 serve to interface with card edge plates 102 of modules 100 and include contacts which electronically link card edge contacts 104 with board 422. One or more board-to-board connectors 428 are mounted to board 422. 90-pin connectors 414 are connected through housing 404 to boards 416.

Boards 416 include one or more board-to-board connectors 418, which mate with the one or more board-to-board connectors 428 to electronically link card edge connectors 104 of switching modules 100 to audio cables connected to 90-pin connectors 414. In housings 402 and 404 are mounting openings 406 and 410 for mounting module 400 to chassis 10 with fasteners inserted through openings 406 and 410 and into openings 18 in second upper plate flange 32 and second lower plate flange 34. Even though the ends of module 400 are open, access to the fasteners for mounting or removal from a chassis 10 may be difficult, since multiple modules 200, 300 and 400 may be mounted side-by-side, blocking the open ends. Upper access slots 408 and lower access slots 412 allow users to see and engage the fasteners, such as with a screwdriver, even when additional modules are mounted alongside module 400. Openings 406 and 410, and access openings 408 and 412 extend through both housings 402 and 404. Openings 406 and 410 are configured as upwardly facing and downwardly facing slots, respectively. A chassis ground 424 and an isolated ground 426 are provided in module 400 and depending on the wiring requirements of a particular application, card edge contacts 104 linked to the common ground circuit on switching module 100 will be linked to one or the other of these grounds.

Designation device 108 is preferably a lens at least partially transparent to visible light so as to allow viewing of indicia held behind the lens, such as an indicia card. Referring now to FIGS. 31 to 36, details of an alternative embodiment lens 508 of designation device 108 for switching module 100 are shown. Lens 508 includes opposing sides 520 and 522, opposing ends 524 and 526, and front face 512 and rear face 514. Flats 516 are located at the rear of lens 508 and tabs 510 extend from flats 516 adjacent to sides 520 and 522. Lens 508 holds indicia on face 140 adjacent to jack 106. Like lens 108, lens 508 is mounted to face 140 by inserting tabs 510 into mounting slots 109 in face 140 of switching module 100. When mounted to face 140, flats 516 rest against face 140. As shown in FIG. 36, line BB represents face 140. Line BB cooperates with rear face 514 and inner walls 528 to form an open ended indicia area 518, where indicia of the circuits connected to the adjacent jack 106, for example a paper strip, may be placed. Ends 530 of area 518 are open adjacent to opposing ends 524 and 526. These open ends 530 allow indicia to be slid directly into area 518 when no modules are mounted in a chassis 10 adjacent to the module 100 to which lens 508 is attached. If an adjacent module interferes with direct access to open ends 530, open ends 530 also provide an opening to insert a tool, such as a thin flat screwdriver blade into to lever lens 508 from face 140. Designation lens 108, shown in FIGS. 3 through 9, has closed ends. To insert indicia into area 518 of a lens 108, a tool such as a thin probe or a wire end is inserted into opening 532 to lever lens 108 from face 140.

The distance between opposing ends 524 and 526 is approximately equal to the width of face 140, though slightly smaller so as not interfere with adjacent modules when mounted in chassis 10. As shown, this distance is approximately 0.5 inches. Due to the small size of the lenses 508 and thus the limits on the size of the indicia held by the lenses, some element of magnification by the lenses may be desired. This is accomplished by using different radii of curvature for front face 512 and rear face 514. As shown in FIG. 36, when viewed in cross section, rear face 514 is essentially planar while front face 512 is shaped along a radius of curvature to provide magnification of indicia within area 518 when viewed through front face 512. Rear face 514 could also be formed with a radius of curvature about the same origin as the radius of curvature of front face 512. The difference in curvature of front face 512 and rear face 514 should be selected in conjunction with the properties of the transparent material used to make the lens to achieve the desired level of magnification.

With regard to the foregoing description, it is to be understood that changes can be made in detail, especially in matters of the construction materials employed and the shape, size and arrangement of the parts without departing from the scope of the present invention. It is intended that the specification and the depicted aspects be considered exemplary only, with a true scope and spirit of the invention being indicated by the broad meaning of the following claims.

What is claimed is as follows:

1. A switching module for electronic signal transmission comprising:
    a first side with a plurality of connectors including a first group of three connectors and a second group of three connectors;
    a second side with a plurality of connectors, including a first jack and a second jack, each of the jacks having a spring contact tip conductor, a second tip conductor, a spring contact ring conductor, a second ring conductor and a shield conductor with a normal closed connection between the spring contact and second tip conductors and a normal closed connection between the spring contact and second ring conductors, each of the jacks configured such that insertion of a plug opens the normal closed connections and electronically connects a tip of the plug to the spring contact tip conductor, a ring of the plug to the spring contact ring conductor, and a shield of the plug to the shield conductor;
    a first plurality of circuits connecting the shield conductor of each of the jacks with a connector within each of the first and second groups of first side connectors;
    a plurality of two position switches having an open position and a closed position; and
    a second plurality of circuits, each including one of the two position switches, one of the circuits linking the spring contact tip conductor of the first jack with the second tip conductor of the second jack, another of the circuits linking the spring contact ring conductor of the first jack with the second ring conductor of the second jack, another of the circuits linking the second tip conductor of the first jack with the second tip conductor of the second jack, and another of the circuits linking the second ring conductor of the first jack with the second ring conductor of the second jack.

2. The switching module of claim 1, wherein the first side connectors are card edge connectors.

3. The switching module of claim 1, wherein the two position switches are sliding switches.

4. The switching module of claim 1, wherein the plurality of first side connectors includes a third group of three connectors and a fourth group of three connectors, and the plurality of second side connectors includes a third jack and a fourth jack, the third and fourth groups of first side connectors and the third and fourth jacks being connected to each other in the same manner that the first and second groups of first side connectors and the first and second jacks are connected with each other.

5. The switching module of claim 1, wherein the module includes designation lenses, the second side connectors being accessible through an outer surface of the module, the outer surface having mounting slots located adjacent to the second side connectors, the outer surface of the module having a width, each of the designation lenses comprising:

a first side and an opposing, spaced apart second side;

a first end and an opposing, spaced apart second end;

a front face and a rear face extending from the first side to the second side and from the first end to the second end;

a first rear wall and a second rear wall extending rearward from the rear face along the first and second sides, respectively, and defining first and second rear mounting flats, respectively;

mounting tabs extending rearward from the rear mounting flats;

the rear face, the first and second rear walls of each of the designation lenses, and outer surface of the module cooperating to define a space for receiving an indicia related to an adjacent second side connector;

the lenses each being formed of a transparent material to allow the indicia within the space to be seen through the lenses;

the lenses each being sized so that when mounted to the outer surface the lenses have a lens width approximately the same as the width of the outer surface.

6. The switching module of claim 1, wherein the circuitry including the two position switches, which connect each of the first and second jacks with the first and second groups of first side connectors, can be configured in three switching slates:

(a) all of the switches being open;

(b) the switch in the circuit connecting the spring contact tip conductor of the first jack with the second tip conductor of the second jack, and the switch in the circuit connecting the spring contact ring conductor of the first jack with the second ring conductor of the second jack being closed and a remainder of the switches being open; and (c) the switch in the circuit connecting the second tip conductor of the first jack with the second tip conductor of the second jack, and the switch in the circuit connecting the second ring conductor of the first jack with the second ring conductor of the second jack being closed and a remainder of the switches being open.

7. The switching module of claim 1, wherein the first side connectors include a common ground connection and the second plurality of circuits including one of the plurality of two position switches connects the shield conductor of each of the jacks with the common ground connector on the first side.

8. The signal module of claim 1, wherein the plurality of circuits includes a circuit board extending in a first direction between a first face of the switching module and a second face of the switching module, the first side connectors located at the first face of the switching module, the second side connectors located at the second face of the connecting module, and the two position switches positioned on the circuit board.

9. A method of configuring an electronic signal transmission circuit, comprising:

providing a switching module for electronic signal transmission comprising:

a first side with a plurality of connectors including a first group of three connectors and a second group of three connectors;

a second side with an even number of connectors grouped into pairs, each pair of connectors including a first jack and a second jack, each of the jacks having a spring contact tip conductor, a second tip conductor, a spring contact ring conductor, a second ring conductor and a shield conductor with a normal closed connection between the spring contact and second tip conductors and a normal closed connection between the spring contact and second ring conductors, each of the jacks configured such that insertion of a plug opens the normal closed connections and electronically connects a tip of the plug to the spring contact tip conductor, a ring of the plug to the spring contact ring conductor, and a shield of the plug to the shield conductor;

a plurality of two position switches having an open position and a closed position; and a plurality of circuits, each including one of the two position switches, one of the circuits linking the spring contact tip conductor of the first jack with the second tip conductor of the second jack, another of the circuits linking the spring contact ring conductor of the first jack with the second ring conductor of the second jack, another of the circuits linking the second tip conductor of the first jack with the second tip conductor of the second jack, and another of the circuits linking the second ring conductor of the first jack with the second ring conductor of the second jack, placing all the two position switches into an open condition so that each of the connectors on the first side is connected directly with a conductor within one of the first and second jacks on the second side.

10. The method of claim 9, wherein the even number of connectors grouped into pairs includes at least a first pair, and wherein the two position switch in the circuit connecting the second tip conductor of the first jack in the first pair with the second tip conductor of the second jack in the first pair is closed, and the two position switch in the circuit connecting the second ring conductor of the first jack in the first pair and the second ring conductor of the second jack in first the pair is closed.

11. The method of claim 9, wherein the even number of connectors grouped into pairs includes at least a first pair, and wherein the two position switch in the circuit connecting the spring contact tip conductor of the first jack in the first pair with the second tip conductor of the second jack in the first pair is closed, and the two position switch in the circuit connecting the spring contact ring conductor of the first jack of the first pair with the second ring conductor of the second jack of the first pair is closed.

12. The method of claim 9, wherein the two position switch in the circuit connecting the shield conductor of a jack with the ground connector on the first side is closed.

13. The method of claim 9, further comprising the steps of:

inserting the switching module into a chassis;

subsequently removing the switching module from the chassis;

switching at least one of the two position switches in the removed switching module; and reinserting the switching module into the chassis.

14. An electronic signal transmission system comprising:

(a) a switching module for signal transmission including:

(1) a first side with a plurality of connectors including a first group of three connectors and a second group of three;

(2) a second side with an even number of connectors grouped into pairs, each pair of connectors including a first jack and a second jack, each of the jacks having a spring contact tip conductor, a second tip conductor, a spring contact ring conductor, a second ring conductor and a shield conductor with a normal closed connection between the spring contact and second tip conductors and a normal closed connection between the spring contact and second ring conductors, each of the jacks configured such that insertion of a plug opens the normal closed connections and electronically connects a tip of the plug to the spring contact tip conductor, a ring of the plug to the spring contact ring conductor, and a shield of the plug to the shield conductor;

(3) a plurality of two position switches having an open position and a closed position; and (4) a plurality of circuits, each including one of the two position switches, one of the circuits linking the spring contact tip conductor of the first jack with the second tip conductor of the second jack, another of the circuits linking the spring contact ring conductor of the first jack with the second ring conductor of the second jack, another of the circuits linking the second tip conductor of the first jack with the second tip conductor of the second jack, and another of the circuits linking the second ring conductor of the first jack with the second ring conductor of the second jack (b) a connecting module including:

(1) a plurality of first side connectors which electronically link to the first side connectors of the switching module;

(2) a second side with a plurality of connectors for attaching to a plurality of cables; and (3) a plurality of circuits electronically linking the first side connectors of the connecting module to the second side connectors of the connector module;

(c) a chassis holding the switching module and the connecting module adjacent to one another, wherein each of the first side connectors of the switching module is electronically connected to a corresponding first side connector of the plurality of first side connectors of the connecting module.

15. The electronic signal transmission system of claim 14, wherein the first side connectors of the switching module are card edge connectors and the first side connectors of the connectors module are mounted in a slot, the slot being configured to electronically link the first side connectors of the connecting module with the first side connectors of the switching module.

16. The electronic signal transmission system of claim 14, wherein a plurality of switching modules may be connected to the connecting module.

17. The electronic signal transmission system of claim 16, wherein the chassis holds a plurality of connecting modules and a plurality of switching modules may be connected to each of the connecting modules.

18. The electronic signal transmission system of claim 16, wherein designation lenses for receiving indicia are located on the second side of the switching modules adjacent to each of the jacks.

19. The electronic signal transmission system of claim 14, wherein the plurality of circuits includes a circuit board extending in a first direction between a first face of the switching module and a second face of the switching module, the first side connectors located at the first face of the switching module, the second side connectors located at the second face of the connecting module, and the two position switches positioned on the circuit board.

20. An electronic signal transmission module comprising:

a front defining an even number of jacks paired together, each of the jacks including tip, ring, and shield contact springs;

a rear with card edge connectors;

a circuit board with a first plurality of circuits electronically connecting the jack contact springs with the card edge connectors; and a second plurality of circuits including a plurality of two position switches mounted on the circuit board which are electronically linked to the first plurality of circuits, the second plurality of circuits connecting the tip and ring contact springs of each of the jacks paired together.

21. The electronic signal transmission module of claim 20, wherein designation lenses for receiving indicia are located on the front adjacent to each of the jacks.

22. A patching device comprising:

circuitry having first and second spring assemblies, each of the first and second spring assembly assemblies including a tip spring, a normal spring corresponding to the tip spring, a ring spring, and a normal spring corresponding to the ring spring; and a switch device having a plurality of switch positions for changing the circuitry between a no normal configuration, a full normal configuration, and a half normal configuration.

23. The patching device of claim 22, further comprising an electrical connector electrically connected to the first and second spring assemblies.

24. The patching device of claim 23, wherein the switch device is electrically positioned between the electrical connector and the first and second spring assemblies.

25. The patching device of claim 24, wherein the electrical connector is electrically connected to the first and second spring assemblies by a circuit board, and wherein the switch device is mounted to the circuit board.

26. The patching device of claim 22, wherein the switch device includes a plurality of 2-position switches.

27. The patching device of claim 22, further comprising a module, wherein the first and second spring assemblies and the switch device are included as part of the module.

28. The patching device of claim 27, wherein the module includes a front end and a rear end, the front end defining patch plug ports for accessing the first and second spring assemblies.

29. The patching device of claim 28, further comprising a rear connector positioned at the rear end of the module, the rear connector being electrically connected to the first and second spring assemblies.

30. The patching device of claim 28, wherein the module further includes a first side and a second side extending between the front end and the rear end, the switch device being positioned at one of the first and second sides of the module.

31. The patching device of claim 22, wherein the patching device includes a first sleeve ground corresponding to the first spring assembly and a second sleeve ground corresponding to the second spring assembly, and wherein the switch device is operable to change the circuitry between an independently-ground configuration and a commonly-ground configuration.

32. The patching device of claim 22, wherein the switch device includes a plurality of switches.

33. The patching device of claim 32, wherein the switches are arranged in a bank.

34. The patching device of claim 32, wherein the switches are DIP switches.

35. The patching device of claim 22, further comprising a chassis and a module that removeably mounts within the chassis, the first and second spring assemblies being part of the module so as to be removeable from the chassis with the module.

36. The patching device of claim 35, wherein the switch device is part of the module so as to be removeable from the chassis with the module.

37. The patching device of claim 36, wherein the chassis includes a front side and a rear side, and wherein the module is removeable from the chassis through the front side of the chassis.

38. A patching device comprising:
circuitry including first and second spring assemblies, each of the first and second spring assemblies including a tip spring, a normal spring corresponding to the tip spring, a ring spring, a normal spring corresponding to the ring spring;
the circuitry also including a first sleeve ground corresponding to the first spring assembly and a second sleeve ground corresponding to the second spring assembly; and
a switch device having a plurality of switch positions for changing the circuitry between an independently-ground configuration and a commonly-ground configuration.

39. The patching device of claim 38, wherein the switch device includes a plurality of switches.

40. The patching device of claim 39, wherein the switches are arranged in a bank.

41. The patching device of claim 39, wherein the switches are DIP switches.

42. The patching device of claim 38, further comprising a chassis and a module that removeably mounts within the chassis, the first and second spring assemblies being part of the module so as to be removeable from the chassis with the module.

43. The patching device of claim 42, wherein the switch device is part of the module so as to be removeable from the chassis with the module.

44. The patching device of claim 43, wherein the chassis includes a front side and a rear side, and wherein the module is removeable from the chassis through the front side of the chassis.

45. A patching module comprising:
a module housing including a front and a back;
first and second patch plug ports located at the front of the module housing;
circuitry having first and second spring assemblies carried by the module housing, each of the first and second spring assemblies including a tip spring, a normal spring corresponding to the tip spring, a ring spring, and a normal spring corresponding to the ring spring, the first spring assembly being accessible through the first patch plug port and the second spring assembly being accessible through the second patch plug port; and
a switch device for changing the circuitry between a no normal configuration, a full normal configuration, and a half normal configuration, the switch device being carried by the module housing.

46. The patching device of claim 45, wherein the switch device includes a plurality of switches.

47. The patching device of claim 46, wherein the switches are arranged in a bank.

48. The patching device of claim 46, wherein the switches are DIP switches.

49. The patching device of claim 45, further comprising fasteners for removeably mounting the module housing to a chassis.

50. A patching device comprising:
circuitry having first and second spring assemblies, each of the first and second spring assemblies including a tip spring, a normal spring corresponding to the tip spring, a ring spring, and a normal spring corresponding to the ring spring; and
means for switching the circuitry between a no normal configuration, a full normal configuration, and a half normal configuration.

51. The patching device of claim 50, further comprising a module, wherein the first and second spring assemblies and the means for switching are included as part of the module.

52. The patching device of claim 51, wherein the module includes a front end and a rear end, the front end defining patch plug ports for accessing the first and second spring assemblies.

53. The patching device of claim 50, wherein the patching device includes a first sleeve ground corresponding to the first spring assembly and a second sleeve ground corresponding to the second spring assembly, and wherein the means for switching is operable to change the circuitry between an independently-ground configuration and a commonly-ground configuration.

54. The patching device of claim 50, further comprising a chassis and a module that removeably mounts within the chassis, the first and second spring assemblies and the means for switching being part of the module so as to be removeable from the chassis with the module.

55. The patching device of claim 50, further comprising a module having a module housing, the module housing including a front end having patch plug ports, the first and second spring assemblies and the means for switching being mounted to the module housing.

56. A patching module comprising:
a module housing including a front and a back;
first and second patch plug ports located at the front of the module housing;
circuitry having first and second spring assemblies carried by the module housing, each of the first and second spring assemblies including a tip spring, a normal spring corresponding to the tip spring, a ring spring, and a normal spring corresponding to the ring spring, the first spring assembly corresponding to the first patch plug port, and the second spring assembly corresponding to the second patch plug port; and
the circuitry further including a grouping of contacts that provide electrical connection locations for changing the circuitry between a no normal configuration, a full normal configuration, and a half normal configuration, the grouping of contacts being carried by the module housing.

57. The patching device of claim 56, further comprising switches for selectively providing electrical connections between the electrical connection locations provided by the contacts.

58. The patching device of claim 57, wherein the switches include 2-position switches.

59. A patching device comprising:

a chassis;

a module removeably mountable to the chassis, the module including:
   a) first and second patch plug ports;
   b) circuitry having first and second spring assemblies, each of the first and second spring assemblies including a tip spring, a normal spring corresponding to the tip spring, a ring spring, and a normal spring corresponding to the ring spring, the first spring assembly being accessible through the first patch plug port and the second spring assembly being accessible through the second patch plug port; and
   c) a switch device for changing the circuitry between a no normal configuration, a full normal configuration, and a half normal configuration.

60. The patching device of claim 59, wherein the switch device includes a plurality of switches.

61. The patching device of claim 60, wherein the switches are arranged in a bank.

62. The patching device of claim 60, wherein the switches are DIP switches.

63. The patching device of claim 60, further comprising fasteners for removeably mounting the module to the chassis.

64. A patching device comprising:

a chassis;

a module removeably mountable to the chassis, the module including:
   a) first and second patch plug ports;
   b) circuitry having first and second spring assemblies, each of the first and second spring assemblies including a tip spring, a normal spring corresponding to the tip spring, a ring spring, and a normal spring corresponding to the ring spring, the first spring assembly corresponding to the first patch plug port, and the second spring assembly corresponding to the second patch plug port; and
   c) a grouping of contacts that provide electrical connection locations for changing the circuitry between a no normal configuration, a full normal configuration, and a half normal configuration.

65. The patching device of claim 64, further comprising switches for selectively providing electrical connections between the electrical connection locations provided by the contacts.

66. The patching device of claim 65, wherein the switches include 2-position switches.

* * * * *

UNITED STATES PATENT AND TRADEMARK OFFICE
CERTIFICATE OF CORRECTION

| | | |
|---|---|---|
| PATENT NO. | : 6,992,257 B2 | Page 1 of 3 |
| APPLICATION NO. | : 09/828706 | |
| DATED | : January 31, 2006 | |
| INVENTOR(S) | : Follingstad et al. | |

It is certified that error appears in the above-identified patent and that said Letters Patent is hereby corrected as shown below:

Col. 12, line 28, claim 9: "jack," should read --jack;--

Col. 18, line 25: Insert omitted claims 67-77 as follows:

--67. A patching device comprising:
a chassis having a front side and a back side, the front side defining a front opening;
a plurality of modules mountable to the chassis such that each individual module of the plurality can be mounted independent of the other modules by insertion of the independent module through a front opening in the chassis, each of the modules including:
 a) first and second patch plug ports;
 b) circuitry having first and second spring assemblies, each of the first and second spring assemblies including a tip spring, a normal spring corresponding to the tip spring, a ring spring, and a normal spring corresponding to the ring spring, the first spring assembly being accessible through the first patch plug port and the second spring assembly being accessible through the second patch plug port; and
 c) a switch device for changing the circuitry between a no normal configuration, a full normal configuration, and a half normal configuration.

68. The patching device of claim 67, wherein the switch device includes a plurality of switches.

69. The patching device of claim 68, wherein the switches are DIP switches.

70. The patching device of claim 67, wherein each of the modules is removeably mountable to the chassis.

71. The patching device of claim 70, further comprising fasteners for removeably mounting the modules to the chassis.

72. The patching device of claim 70, wherein the switch device is part of the module so as to be removeable from the chassis with the module.

UNITED STATES PATENT AND TRADEMARK OFFICE
CERTIFICATE OF CORRECTION

| | |
|---|---|
| PATENT NO. | : 6,992,257 B2 |
| APPLICATION NO. | : 09/828706 |
| DATED | : January 31, 2006 |
| INVENTOR(S) | : Follingstad et al. |

It is certified that error appears in the above-identified patent and that said Letters Patent is hereby corrected as shown below:

73. A patching device comprising:
   a chassis;
   a module mountable to the chassis, the module including:
      a) a dielectric body defining a front face;
      b) first and second patch plug ports formed in the front face of the dielectric body;
      c) first and second spring assemblies supported by the dielectric body, each of the first and second spring assemblies including a tip spring, a normal spring corresponding to the tip spring, a ring spring, and a normal spring corresponding to the ring spring, the first spring assembly being accessible through the first patch plug port and the second spring assembly being accessible through the second patch plug port; and
      d) a switch device for changing the circuitry between a no normal configuration, a full normal configuration, and a half normal configuration, the switch device being supported by the dielectric body.

74. The patching device of claim 73, further include flanges configured to receive fasteners to removeably mount the module to the chassis.

75. The patching device of claim 74, wherein the flanges include upper and lower flanges located adjacent the front face of the dielectric body.

76. The patching device of claim 73, wherein the chassis has a front side and a back side, the module being mountable to the front side of the chassis.

UNITED STATES PATENT AND TRADEMARK OFFICE
CERTIFICATE OF CORRECTION

PATENT NO.         : 6,992,257 B2
APPLICATION NO. : 09/828706
DATED                 : January 31, 2006
INVENTOR(S)        : Follingstad et al.

It is certified that error appears in the above-identified patent and that said Letters Patent is hereby corrected as shown below:

77.    A patching device comprising:
    a chassis having a front side and a back side;
    a module mountable to the chassis, the module including:
        a) a dielectric body defining a front face;
        b) upper and lower mounting extensions located at opposite ends of the front face of the dielectric body, the upper and lower mounting extensions including mounting holes for receipt of fasteners for mounting the module to chassis holes formed in the chassis, the chassis holes being located at the front side of the chassis;
        c) first and second patch plug ports formed in the front face of the dielectric body;
        d) first and second spring assemblies carried by the dielectric body, each of the first and second spring assemblies including a tip spring, a normal spring corresponding to the tip spring, a ring spring, and a normal spring corresponding to the ring spring, the first spring assembly being accessible through the first patch plug port and the second spring assembly being accessible through the second patch plug port; and
        e) a switch device for changing the circuitry between a no normal configuration, a full normal configuration, and a half normal configuration, the switch device being carried by the dielectric body.--

Signed and Sealed this

Third Day of October, 2006

JON W. DUDAS
*Director of the United States Patent and Trademark Office*